United States Patent
Zhang et al.

(10) Patent No.: US 12,479,800 B2
(45) Date of Patent: Nov. 25, 2025

(54) PHENYLPROPIONAMIDE COMPOUND AND USE THEREOF

(71) Applicants: MEDSHINE DISCOVERY INC., Jiangsu (CN); Guangzhou Consun Pharmaceutical Co. Ltd, Guangdong (CN)

(72) Inventors: Yang Zhang, Shanghai (CN); Wentao Wu, Shanghai (CN); Zhixiang Li, Shanghai (CN); Wenyuan Zhu, Shanghai (CN); Jian Qin, Shanghai (CN); Shuhui Chen, Shanghai (CN)

(73) Assignees: MEDSHINE DISCOVERY INC., Jiangsu (CN); Guangzhou Consun Pharmaceutical Co. Ltd, Guangdong (CN)

( * ) Notice: Subject to any disclaimer, the term of this patent is extended or adjusted under 35 U.S.C. 154(b) by 645 days.

(21) Appl. No.: 17/922,188

(22) PCT Filed: Apr. 30, 2021

(86) PCT No.: PCT/CN2021/091547
§ 371 (c)(1),
(2) Date: Oct. 28, 2022

(87) PCT Pub. No.: WO2021/219134
PCT Pub. Date: Nov. 4, 2021

(65) Prior Publication Data
US 2023/0174487 A1    Jun. 8, 2023

(30) Foreign Application Priority Data

Apr. 30, 2020   (CN) .................. 202010365940.6

(51) Int. Cl.
| C07D 471/10 | (2006.01) |
| A61K 31/438 | (2006.01) |
| C07D 211/58 | (2006.01) |
| C07D 487/04 | (2006.01) |

(52) U.S. Cl.
CPC .......... C07D 211/58 (2013.01); C07D 471/10 (2013.01); C07D 487/04 (2013.01)

(58) Field of Classification Search
CPC .. C07D 471/10; C07D 211/56; C07D 487/04; A61K 31/438; A61K 31/445; A61K 31/407; A61P 25/04; A61P 17/04

USPC .......... 546/16, 244, 245; 548/453; 514/278, 514/329, 330, 412
See application file for complete search history.

(56) References Cited

U.S. PATENT DOCUMENTS

| 8,217,007 B1 | 7/2012 | Schteingart et al. |
| 9,321,810 B2 | 4/2016 | Schteingart et al. |
| 2019/0144499 A1 | 5/2019 | Li et al. |
| 2020/0172573 A1 | 6/2020 | Zhang et al. |

FOREIGN PATENT DOCUMENTS

| CN | 101627049 A | 1/2010 |
| CN | 109280075 A | 1/2019 |
| CN | 109280076 A | 1/2019 |
| WO | WO-2016181408 A2 | 11/2016 |
| WO | WO-2019015644 A1 | 1/2019 |

OTHER PUBLICATIONS

Aug. 6, 2021 International Search Report issued in International Patent Application No. PCT/CN2021/091547.
Aug. 6, 2021 Written Opinion of the International Searching Authority issued in International Patent Application No. PCT/CN2021/091547.
Feb. 13, 2024 First Office Action issued in Japanese Patent Application No. 2022-566488.
Apr. 24, 2024 Supplementary European Search Report issued in European Patent Application No. 21796159.8.

*Primary Examiner* — Charanjit Aulakh
(74) *Attorney, Agent, or Firm* — Harness, Dickey & Pierce, P.L.C.

(57) ABSTRACT

The use of a phenylpropionamide compound in the preparation of a drug for treating diseases associated with pain and pruritus. Specifically, the present invention relates to a compound as represented by formula (I) or a pharmaceutically acceptable salt thereof.

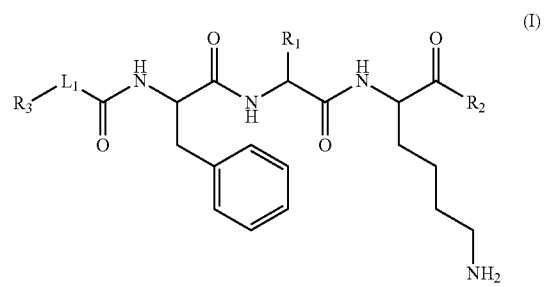

15 Claims, No Drawings

PHENYLPROPIONAMIDE COMPOUND AND USE THEREOF

CROSS-REFERENCE TO RELATED APPLICATIONS

The present application is a U.S. National Phase Application under 35 U.S.C. 371 of International Application No. PCT/CN2021/091547, filed on Apr. 30, 2021, which claims the benefit of Chinese Patent Application 202010365940.6, filed on Apr. 30, 2020. The entire disclosures of the above applications are incorporated herein by reference.

The present application claims the right of the priority of Chinese patent application CN202010365940.6 filed on Apr. 30, 2020. The contents of the above Chinese patent application are incorporated herein by reference in its entireties.

TECHNICAL FIELD

The present disclosure relates to a use of a phenylpropionamide compound in the manufacture of a medicament for the treatment of diseases associated with pain and pruritus, and specifically relates to a compound represented by formula (I) or a pharmaceutically acceptable salt thereof.

BACKGROUND

Opioid receptor is an important class of G protein-coupled receptor across seven membranes, including subtypes such as MOR, DOR, KOR, and OLR, and the opioid receptor is widely distributed throughout the brain, spinal cord, and periphery. Kappa opioid receptor (KOR) is encoded by a single gene OPRK located on human chromosome 8q11.2. Similar to MOR, KOR is widely expressed in the brain, spinal cord, and peripheral nerves. Kappa opioid receptor agonist can produce analgesic effect through at least two mechanisms: (i) direct inhibition of neuronal transport of pain signals and (ii) indirect anti-inflammatory effect.

Opioid receptor agonists with central effects can suppress pain, but they are associated with localized side effects such as sedation, restlessness, and increased urine output. Activation of peripheral opioid receptor can produce analgesic effect and reduce side effect of the central nervous system. This method has been proved to relieve the pain of traditional central opioids. Peripheral restricted KOR agonist does not cross the blood-brain barrier, so it does not affect KOR located in the brain or spinal cord. Conductivity of pain signals can be reduced by acting on peripherally located kappa receptor without centrally mediated adverse effect.

CONTENT OF THE PRESENT INVENTION

The present disclosure provides a compound represented by formula (I) or a pharmaceutically acceptable salt thereof,

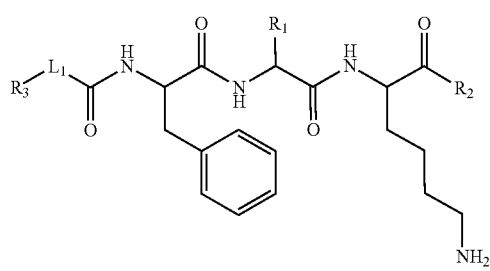

wherein, $R_1$ is selected from $C_{3-5}$ cycloalkyl and —$C_{1-3}$ alkyl-$C_{3-5}$ cycloalkyl, and the $C_{3-5}$ cycloalkyl and —$C_{1-3}$ alkyl-$C_{3-5}$ cycloalkyl are optionally substituted by 1, 2 or 3 $R_a$;

$R_2$ is selected from

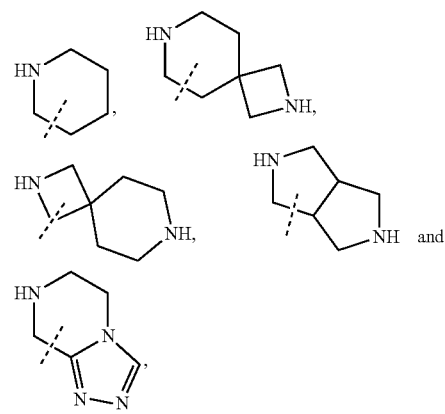

and the

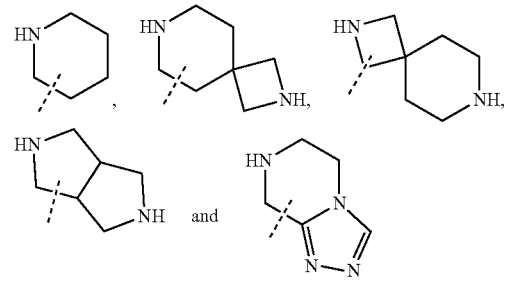

are optionally substituted by 1, 2 or 3 $R_b$;

$L_1$ is selected from —N($R_e$)—C($R_c$)($R_d$)— with the nitrogen atom connected to $R_3$ and the carbon atom connected to —C(=O)—;

$R_3$ is selected from —$C_{1-3}$ alkyl-phenyl, and the —$C_{1-3}$ alkyl-phenyl is optionally substituted by 1, 2 or 3 $R_f$;

$R_a$ and $R_f$ are selected from F, Cl, Br and $CH_3$;

$R_b$ is selected from F, Cl, Br, $NH_2$, COOH, $C_{1-3}$ alkyl, $C_{1-3}$ alkoxy, —C(=O)—$C_{1-3}$ alkyl and —NH—C(=O)NH—$C_{1-3}$ alkyl, and the $C_{1-3}$ alkyl, $C_{1-3}$ alkoxy, —C(=O)—$C_{1-3}$ alkyl and —NH—C(=O)NH—$C_{1-3}$ alkyl are optionally substituted by 1, 2 or 3R;

$R_c$ and $R_d$ are each independently selected from H, $NH_2$ and $CH_3$;

$R_e$ is selected from H and $CH_3$;

R is selected from F, Cl and Br.

In some embodiments of the present disclosure, the $R_1$ is selected from cyclopropyl, cyclopentyl and —$CH_2$-cyclopropyl, and the cyclopropyl, cyclopentyl and —$CH_2$-cyclopropyl are optionally substituted by 1, 2 or 3 $R_a$, and the other variables are as defined herein.

In some embodiments of the present disclosure, the $R_1$ is selected from

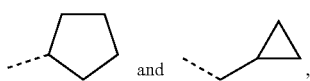 and and the other variables are as defined herein.

In some embodiments of the present disclosure, the $R_b$ is selected from F, Cl, Br, $NH_2$, COOH, $CH_3$, $CF_3$, $OCH_3$, —C(=O)—$CH_3$ and —NH—C(=O)NH—$CH_3$, and the other variables are as defined herein.

In some embodiments of the present disclosure, the $R_2$ is selected from

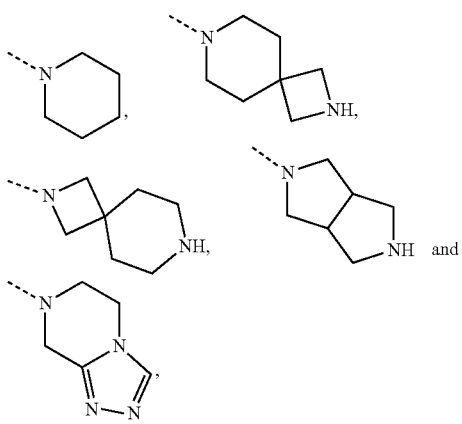

and the

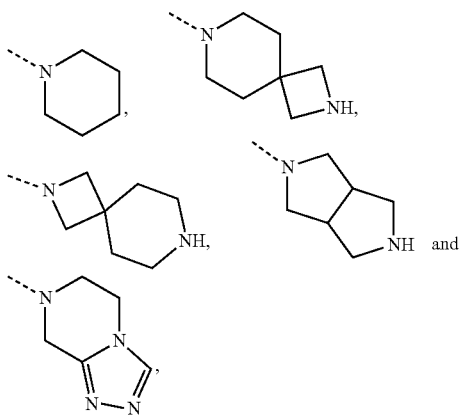

are optionally substituted by 1, 2 or 3 $R_b$, and the other variables are as defined herein.

In some embodiments of the present disclosure, the $R_2$ is selected from

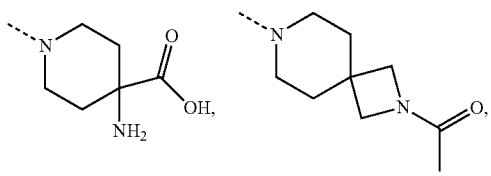

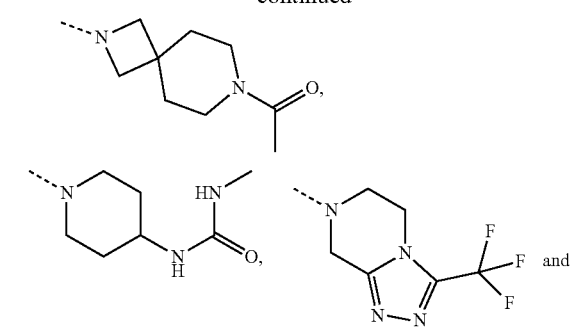

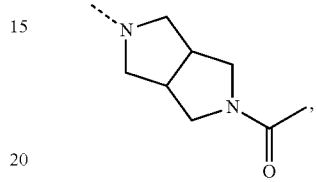

and the other variables are as defined herein.

In some embodiments of the present disclosure, the $R_3$ is selected from

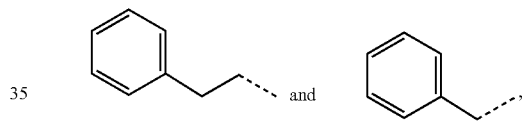

and the

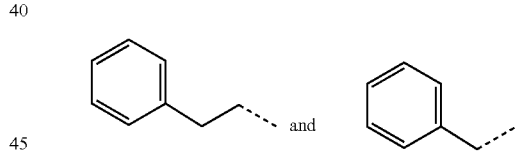

are optionally substituted by 1, 2 or 3 $R_f$, and the other variables are as defined herein.

In some embodiments of the present disclosure, the $R_3$ is selected from

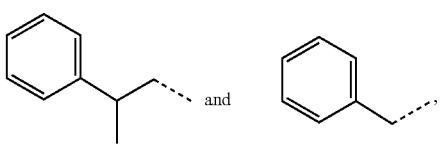

and the other variables are as defined herein.

In some embodiments of the present disclosure, the $L_1$ is selected from —NH—$CH_2$—, and the other variables are as defined herein.

In some embodiments of the present disclosure, the $R_3$-$L_1$- is selected from

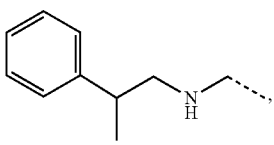

and the other variables are as defined herein.

The present disclosure provides a compound represented by formula (I) or a pharmaceutically acceptable salt thereof,

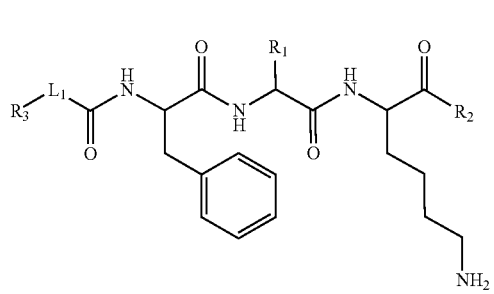

(I)

wherein, $R_1$ is selected from $C_{3-5}$ cycloalkyl and —$C_{1-3}$ alkyl-$C_{3-5}$ cycloalkyl, and the $C_{3-5}$ cycloalkyl and —$C_{1-3}$ alkyl-$C_{3-5}$ cycloalkyl are optionally substituted by 1, 2 or 3 $R_a$;

$R_2$ is selected from

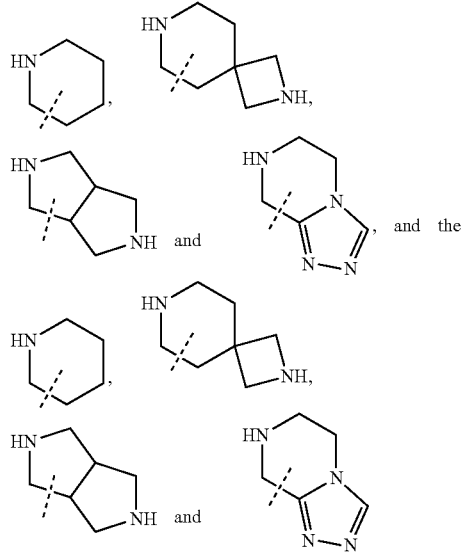

, and the are optionally substituted by 1, 2 or 3 $R_b$;

$L_1$ is selected from —$C(R_c)(R_d)$— and —$N(R_e)$—$C(R_c)(R_d)$—;

$R_3$ is selected from —$C_{1-3}$ alkyl-phenyl, and the —$C_{1-3}$ alkyl-phenyl is optionally substituted by 1, 2 or 3 $R_f$;

$R_a$ and $R_f$ are selected from F, Cl, Br and $CH_3$;

$R_b$ is selected from F, Cl, Br, $NH_2$, COOH, $C_{1-3}$ alkyl, $C_{1-3}$ alkoxy and —C(=O)—$C_{1-3}$ alkyl, and the $C_{1-3}$ alkyl, $C_{1-3}$ alkoxy and —C(=O)—$C_{1-3}$ alkyl are optionally substituted by 1, 2 or 3R;

$R_c$ and $R_d$ are each independently selected from H, $NH_2$ and $CH_3$;

$R_e$ is selected from H and $CH_3$;

R is selected from F, Cl and Br.

In some embodiments of the present disclosure, the $R_1$ is selected from cyclopropyl, cyclopentyl and —$CH_2$-cyclopropyl, and the cyclopropyl, cyclopentyl and —$CH_2$-cyclopropyl are optionally substituted by 1, 2 or 3 $R_a$, and the other variables are as defined herein.

In some embodiments of the present disclosure, the $R_1$ is selected from

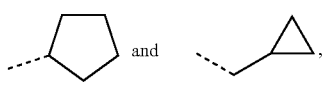

and the other variables are as defined herein.

In some embodiments of the present disclosure, the $R_b$ is selected from F, Cl, Br, $NH_2$, COOH, $CH_3$, $CF_3$, $OCH_3$ and —C(=O)—$CH_3$, and the other variables are as defined herein.

In some embodiments of the present disclosure, the $R_2$ is selected from

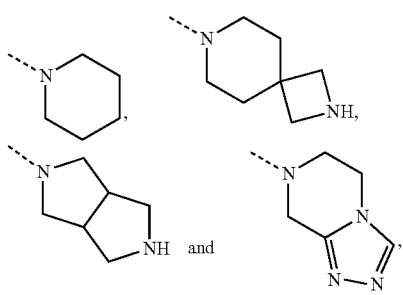

and the

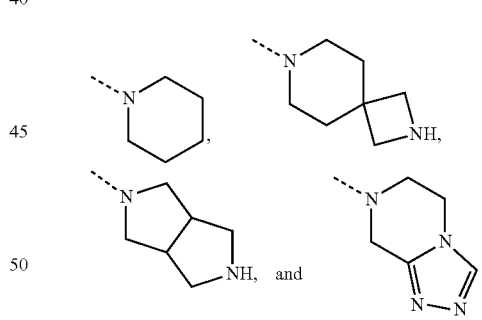

are optionally substituted by 1, 2 or 3 $R_b$, and the other variables are as defined herein.

In some embodiments of the present disclosure, the $R_2$ is selected from

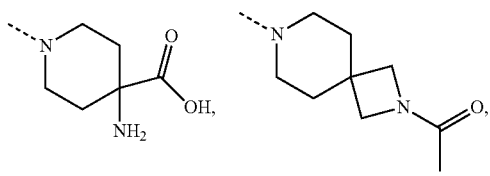

-continued

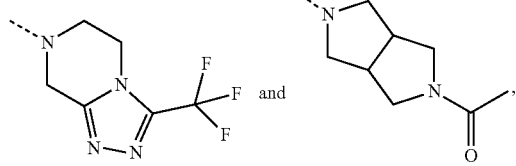 and and the other variables are as defined herein.

In some embodiments of the present disclosure, the $R_3$ is selected from

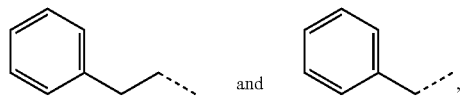

and the

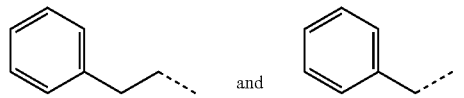

are optionally substituted by 1, 2 or 3 $R_f$, and the other variables are as defined herein.

In some embodiments of the present disclosure, the $R_3$ is selected from

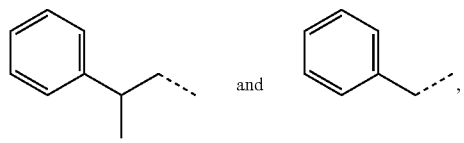

and the other variables are as defined herein.

In some embodiments of the present disclosure, the $L_1$ is selected from —$CH_2$—, —$CH(NH_2)$— and —NH—$CH_2$—, and the other variables are as defined herein.

In some embodiments of the present disclosure, the $R_3$-$L_1$- is selected from

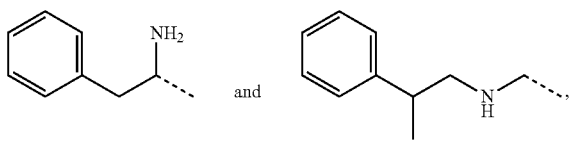

and the other variables are as defined herein.

Some embodiments of the present disclosure are formed by any combination of the above variables.

In some embodiments of the present disclosure, the compound or the pharmaceutically acceptable salt thereof is selected from:

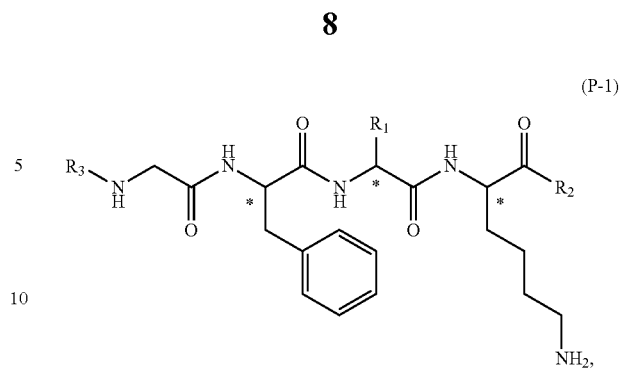

(P-1)

$R_1$, $R_2$ and $R_3$ are as defined herein;
the carbon atoms with "*" are chiral carbon atoms and exist in the form of (R) or (S) single enantiomer or enriched in one enantiomer.

In some embodiments of the present disclosure, the compound or the pharmaceutically acceptable salt thereof is selected from:

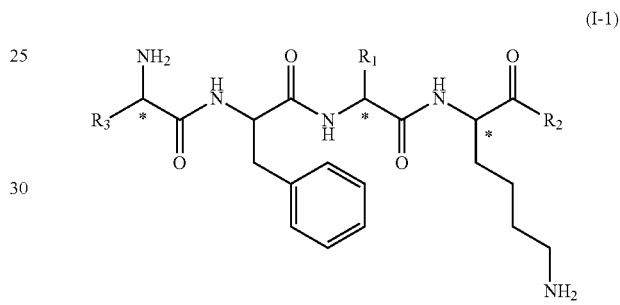

(I-1)

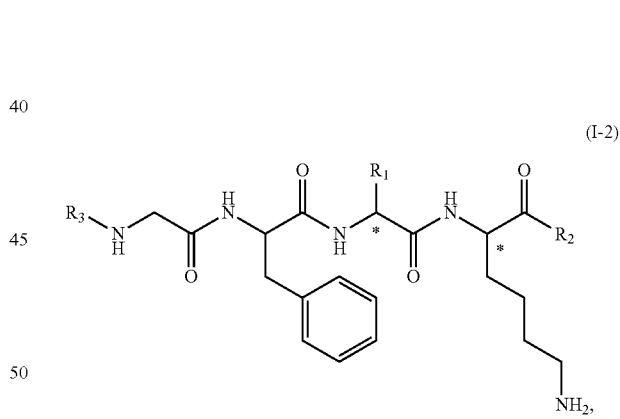

(I-2)

$R_1$, $R_2$ and $R_3$ are as defined herein;
the carbon atoms with "*" are chiral carbon atoms and exist in the form of (R) or (S) single enantiomer or enriched in one enantiomer.

The present disclosure also provides a compound represented by the following formula or a pharmaceutically acceptable salt thereof:

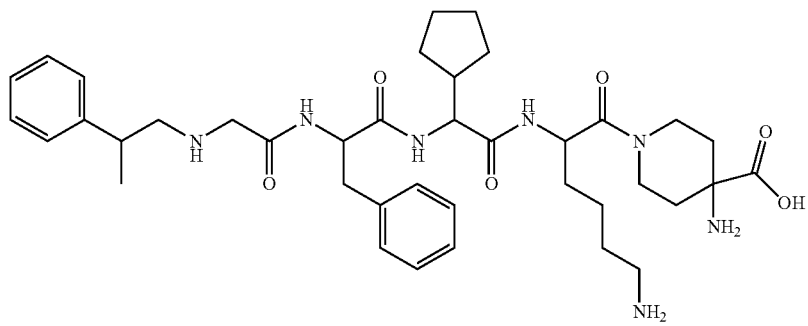
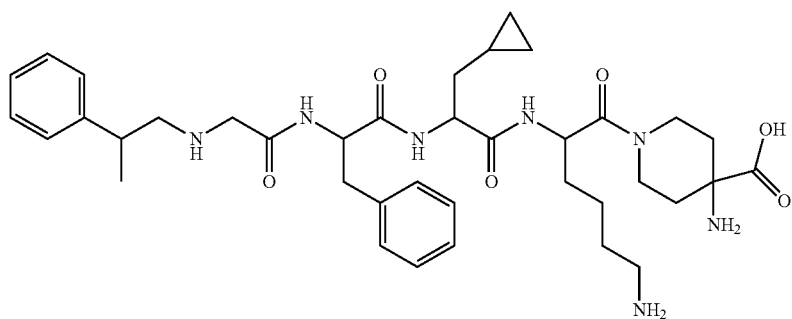
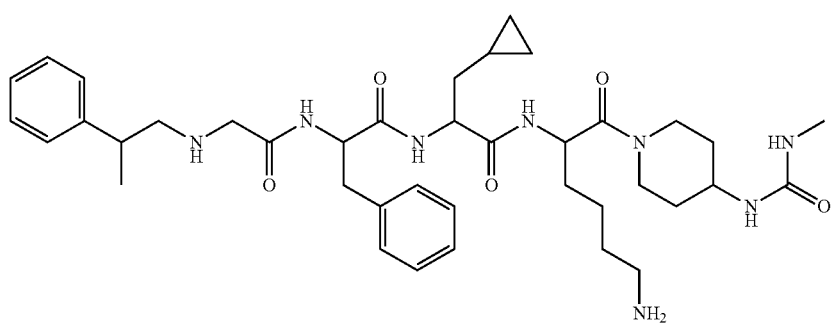
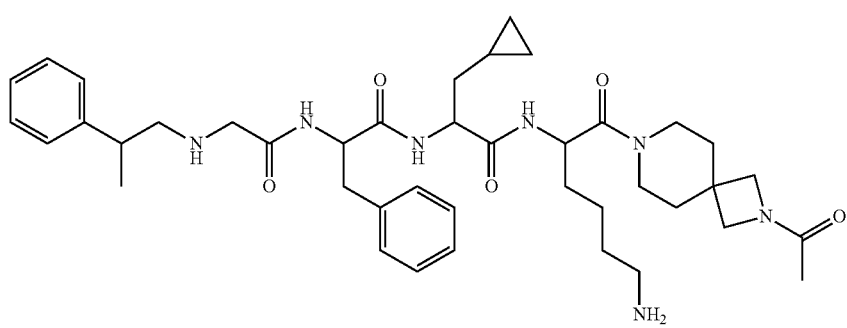
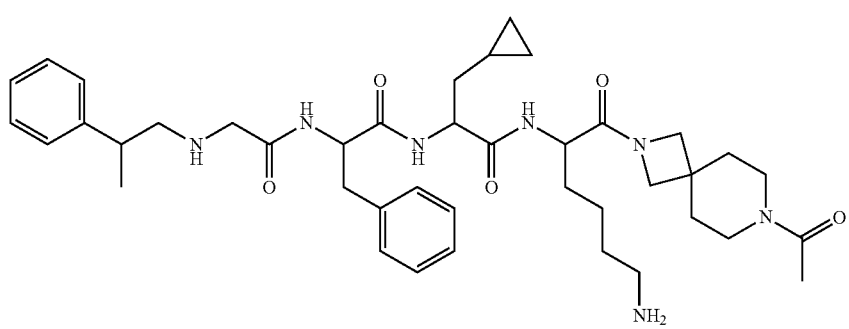

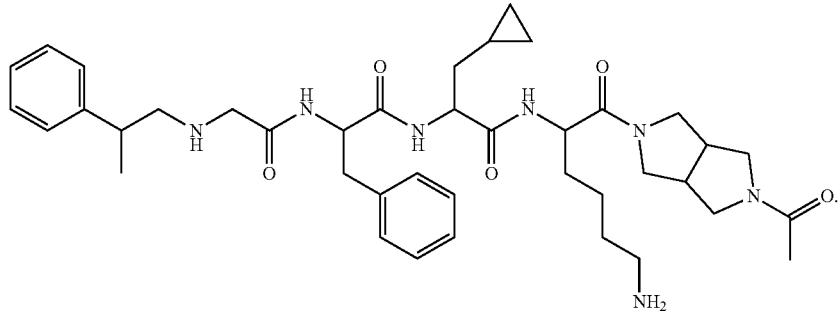
In some embodiments of the present disclosure, the compound or the pharmaceutically acceptable salt thereof is selected from
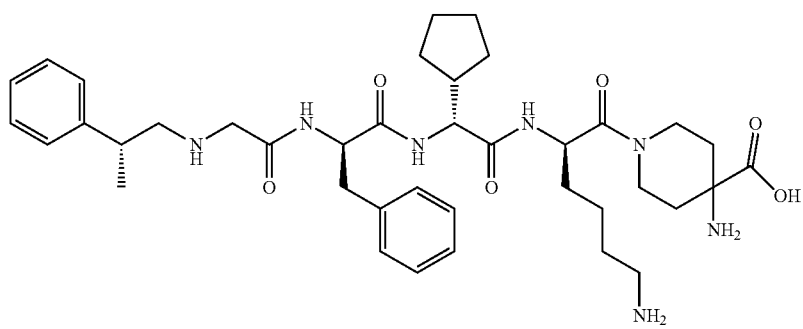
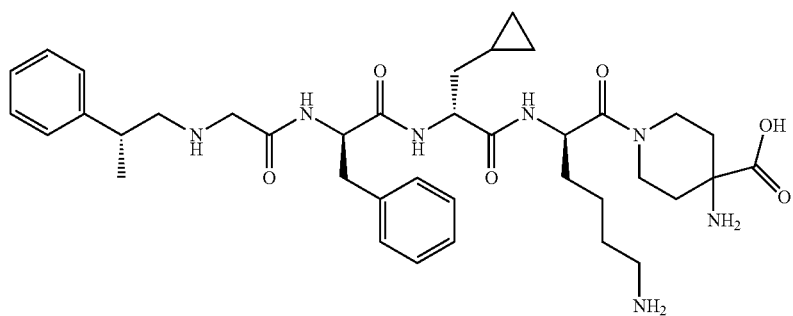
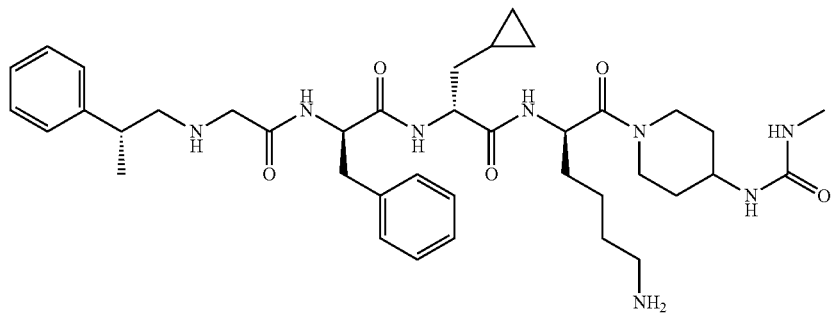

-continued

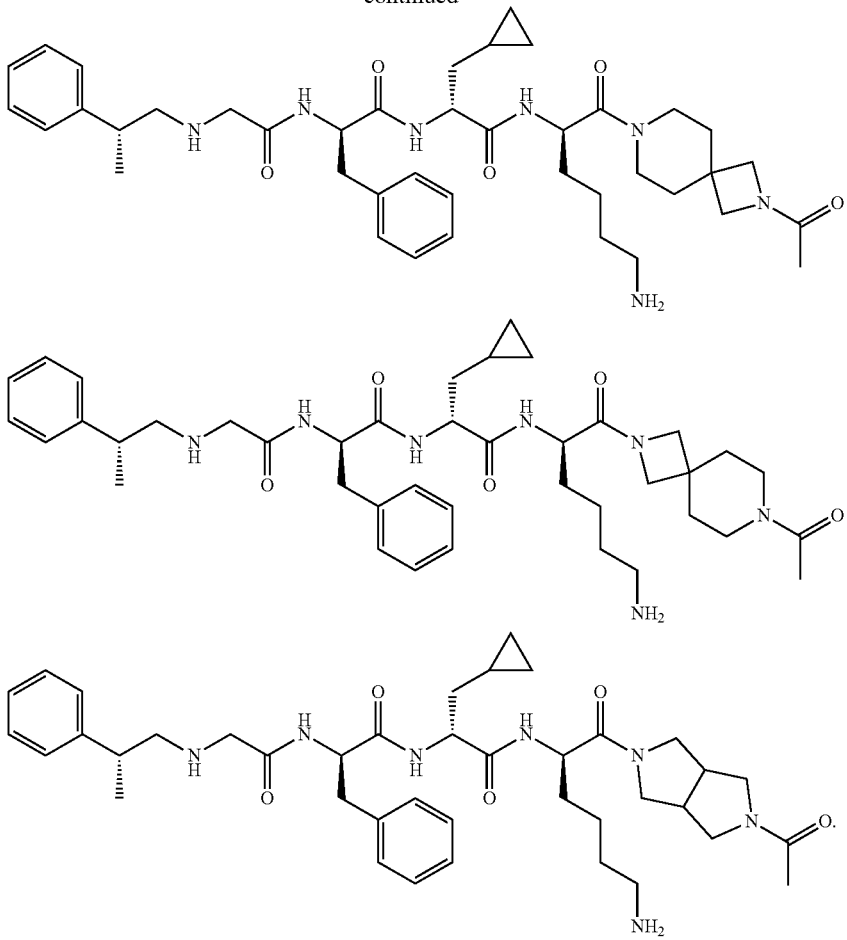

The present disclosure also provides a use of the compound or the pharmaceutically acceptable salt thereof in the manufacture of a medicament for the treatment of a disease associated with kappa receptor agonists.

In some embodiments of the present disclosure, the use is characterized in that the medicament associated with kappa receptor agonists is a medicament for pain and pruritus.

Definition and Description

Unless otherwise indicated, the following terms and phrases used herein are intended to have the following meanings. A specific term or phrase should not be considered indefinite or unclear in the absence of a particular definition, but should be understood in the conventional sense. When a trade name appears herein, it is intended to refer to its corresponding commodity or active ingredient thereof.

The term "pharmaceutically acceptable" is used herein in terms of those compounds, materials, compositions, and/or dosage forms, which are suitable for use in contact with human and animal tissues within the scope of reliable medical judgment, with no excessive toxicity, irritation, allergic reaction or other problems or complications, commensurate with a reasonable benefit/risk ratio.

The term "pharmaceutically acceptable salt" refers to a salt of the compound of the present disclosure that is prepared by reacting the compound having a specific substituent of the present disclosure with a relatively non-toxic acid or base. When the compound of the present disclosure contains a relatively acidic functional group, a base addition salt can be obtained by bringing the neutral form of the compound into contact with a sufficient amount of base in a pure solution or a suitable inert solvent. The pharmaceutically acceptable base addition salt includes a salt of sodium, potassium, calcium, ammonium, organic amine or magnesium or similar salts. When the compound of the present disclosure contains a relatively basic functional group, an acid addition salt can be obtained by bringing the neutral form of the compound into contact with a sufficient amount of acid in a pure solution or a suitable inert solvent. Examples of the pharmaceutically acceptable acid addition salt include an inorganic acid salt, wherein the inorganic acid includes, for example, hydrochloric acid, hydrobromic acid, nitric acid, carbonic acid, bicarbonate, phosphoric acid, monohydrogen phosphate, dihydrogen phosphate, sulfuric acid, hydrogen sulfate, hydroiodic acid, phosphorous acid, and the like; and an organic acid salt, wherein the organic acid includes, for example, acetic acid, propionic acid, isobutyric acid, maleic acid, malonic acid, benzoic acid, succinic acid, suberic acid, fumaric acid, lactic acid, mandelic acid, phthalic acid, benzenesulfonic acid, p-toluenesulfonic acid, citric acid, tartaric acid, and methanesulfonic acid, and the like; and an salt of amino acid (such as arginine and the like), and a salt of an organic acid such as glucuronic acid and the like. Certain specific compounds of the present disclosure contain both basic and acidic functional groups and can be converted to any base or acid addition salt.

The pharmaceutically acceptable salt of the present disclosure can be prepared from the parent compound that contains an acidic or basic moiety by conventional chemical methods. Generally, such salt can be prepared by reacting the free acid or base form of the compound with a stoichiometric amount of an appropriate base or acid in water or an organic solvent or a mixture thereof.

Unless otherwise specified, the term "isomer" is intended to include geometric isomer, cis-trans isomer, stereoisomer, enantiomer, optical isomer, diastereomer and tautomer.

The compound of the present disclosure may present in a specific geometric or stereoisomeric form. The present disclosure contemplates all such compounds, including cis and trans isomer, (−)- and (+)-enantiomer, (R)- and (S)-enantiomer, diastereoisomer, (D)-isomer, (L)-isomer, and racemic mixture and other mixtures, for example, an enantiomer or diastereoisomer enriched mixture, all of which are encompassed within the scope of the present disclosure. The substituent such as alkyl may have an additional asymmetric carbon atom. All these isomers and mixtures thereof are encompassed within the scope of the present disclosure.

Unless otherwise specified, the term "enantiomer" or "optical isomer" refers to stereoisomers that are mirror images of each other.

Unless otherwise specified, the term "cis-trans isomer" or "geometric isomer" is caused by the inability to rotate freely of double bonds or single bonds of ring-forming carbon atoms.

Unless otherwise specified, the term "diastereomer" refers to a stereoisomer in which a molecule has two or more chiral centers and the relationship between the molecules is not mirror images.

Unless otherwise specified, "(D)" or "(+)" refers to dextrorotation, "(L)" or "(−)" refers to levorotation, and "(DL)" or "(±)" refers to racemic.

Unless otherwise specified, the absolute configuration of a stereogenic center is represented by a wedged solid bond (🖋) and a wedged dashed bond (🖋), and the relative configuration of a stereogenic center is represented by a straight solid bond (🖋) and a straight dashed bond (🖋), a wave line (🖋) is used to represent a wedged solid bond (🖋) or a wedged dashed bond (🖋), or the wave line (🖋) is used to represent a straight solid bond (🖋) and a straight dashed bond (🖋).

Unless otherwise specified, the terms "enriched in one isomer", "enriched in isomers", "enriched in one enantiomer" or "enriched in enantiomers" refer to the content of one of the isomers or enantiomers is less than 100%, and the content of the isomer or enantiomer is greater than or equal to 60%, or greater than or equal to 70%, or greater than or equal to 80%, or greater than or equal to 90%, or greater than or equal to 95%, or greater than or equal to 96%, or greater than or equal to 97%, or greater than or equal to 98%, or greater than or equal to 99%, or greater than or equal to 99.5%, or greater than or equal to 99.6%, or greater than or equal to 99.7%, or greater than or equal to 99.8%, or greater than or equal to 99.9%.

Unless otherwise specified, the term "isomer excess" or "enantiomer excess" refers to the differential value between the relative percentages of two isomers or two enantiomers. For example, if the content of one isomer or enantiomer is 90%, and the content of the other isomer or enantiomer is 10%, and the isomer or enantiomer excess (ee value) is 80%.

Optically active (R)- and (S)-isomer, or D and L isomer can be prepared using chiral synthesis or chiral reagents or other conventional techniques. If one kind of enantiomer of certain compound of the present disclosure is to be obtained, the pure desired enantiomer can be obtained by asymmetric synthesis or derivative action of chiral auxiliary followed by separating the resulting diastereomeric mixture and cleaving the auxiliary group. Alternatively, when the molecule contains a basic functional group (such as amino) or an acidic functional group (such as carboxyl), the compound reacts with an appropriate optically active acid or base to form a salt of the diastereomeric isomer which is then subjected to diastereomeric resolution through the conventional method in the art to give the pure enantiomer. In addition, the enantiomer and the diastereoisomer are generally isolated through chromatography which uses a chiral stationary phase and optionally combines with a chemical derivative method (for example, carbamate generated from amine).

The compound of the present disclosure may contain an unnatural proportion of atomic isotope at one or more than one atom (s) that constitute the compound. For example, the compound can be radiolabeled with a radioactive isotope, such as tritium ($^3$H), iodine-125 ($^{125}$I) or C-14 ($^{14}$C). For another example, deuterated drugs can be formed by replacing hydrogen with heavy hydrogen, the bond formed by deuterium and carbon is stronger than that of ordinary hydrogen and carbon, compared with non-deuterated drugs, deuterated drugs have the advantages of reduced toxic and side effects, increased drug stability, enhanced efficacy, extended biological half-life of drugs, etc. All isotopic variations of the compound of the present disclosure, whether radioactive or not, are encompassed within the scope of the present disclosure.

The term "optional" or "optionally" means that the subsequent event or condition may occur but not requisite, that the term includes the instance in which the event or condition occurs and the instance in which the event or condition does not occur.

The term "substituted" means one or more than one hydrogen atom (s) on a specific atom are substituted by a substituent, including deuterium and hydrogen variants, as long as the valence of the specific atom is normal and the substituted compound is stable. When the substituent is a keto group (i.e., =O), it means two hydrogen atoms are substituted. Positions on an aromatic ring cannot be substituted by a keto group. The term "optionally substituted" means an atom can be substituted by a substituent or not, unless otherwise specified, the species and number of the substituent may be arbitrary as long as being chemically achievable.

When any variable (such as R) occurs in the constitution or structure of the compound more than once, the definition of the variable at each occurrence is independent. Thus, for example, if a group is substituted by 0-2R, the group can be optionally substituted by up to two R, wherein the definition of R at each occurrence is independent. Moreover, a combination of the substituent and/or the variant thereof is allowed only when the combination results in a stable compound.

When the number of a linking group is 0, such as —(CRR)$_0$—, it means that the linking group is a single bond.

When the number of a substituent is 0, it means that the substituent does not exist, for example, -A-(R)$_0$ means that the structure is actually -A.

When a substituent is vacant, it means that the substituent does not exist, for example, when X is vacant in A-X, the structure of A-X is actually A.

When one of the variables is selected from a single bond, it means that the two groups linked by the single bond are connected directly. For example, when L in A-L-Z represents a single bond, the structure of A-L-Z is actually A-Z.

When a bond of a substituent can be cross-linked to two or more atoms on a ring, such a substituent can be bonded to any atom on the ring, for example, a structural unit

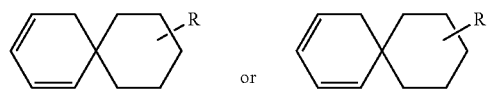

means that a substituent R can be substituted at any position on cyclohexyl or cyclohexadiene. When the enumerative substituent does not indicate by which atom it is linked to the group to be substituted, such substituent can be bonded by any atom thereof. For example, when pyridyl acts as a substituent, it can be linked to the group to be substituted by any carbon atom on the pyridine ring.

When the enumerative linking group does not indicate the direction for linking, the direction for linking is arbitrary, for example, the linking group L contained in

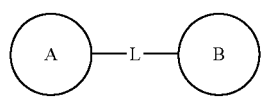

is -M-W—, then -M-W— can link ring A and ring B to form

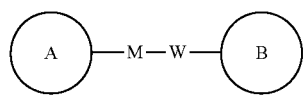

in the direction same as left-to-right reading order, and form

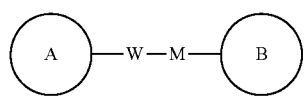

in the direction contrary to left-to-right reading order. A combination of the linking groups, substituents and/or variables thereof is allowed only when such combination can result in a stable compound.

Unless otherwise specified, when a group has one or more linkable sites, any one or more sites of the group can be linked to other groups through chemical bonds. When the linking site of the chemical bond is not positioned, and there is H atom at the linkable site, then the number of H atom at the site will decrease correspondingly with the number of chemical bonds linking thereto so as to meet the corresponding valence. The chemical bond between the site and other groups can be represented by a straight solid bond (╱), a straight dashed bond (╱) or a wavy line

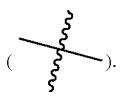

For example, the straight solid bond in —OCH$_3$ means that it is linked to other groups through the oxygen atom in the group; the straight dashed bonds in

means that it is linked to other groups through the two ends of nitrogen atom in the group; the wave lines in

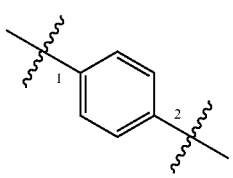 [SMILES: *c1ccc(*)cc1]

means that the phenyl group is linked to other groups through carbon atoms at position 1 and position 2;

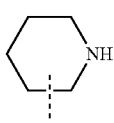

means that it can be linked to other groups through any linkable sites on the piperidinyl by one chemical bond, including at least four types of linkage, including

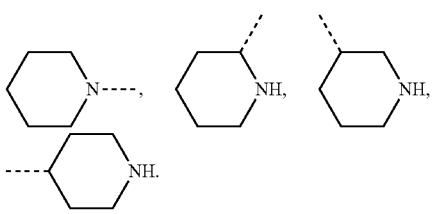

Even though the H atom is drawn on the —N—,

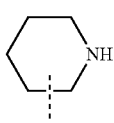

still includes the linkage of

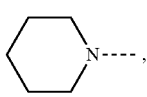

merely when one chemical bond was connected, the H of this site will be reduced by one to the corresponding monovalent piperidinyl.

Unless otherwise specified, the term "$C_{1-3}$ alkyl" refers to a linear or branched saturated hydrocarbon group consisting of 1 to 3 carbon atoms. The $C_{1-3}$ alkyl includes $C_{1-2}$ and $C_{2-3}$ alkyl, etc.; it can be monovalent (such as methyl), divalent (such as methylene) or multivalent (such as methine). Examples of $C_{1-3}$ alkyl include but are not limited to methyl (Me), ethyl (Et), propyl (including n-propyl and isopropyl), etc.

Unless otherwise specified, the term "$C_{1-3}$ alkoxy" refers to an alkyl containing 1 to 3 carbon atoms that are connected to the rest of the molecule through an oxygen atom. The $C_{1-3}$ alkoxy includes $C_{1-2}$, $C_{2-3}$, $C_3$ and $C_2$ alkoxy, etc. Examples of $C_{1-3}$ alkoxy include, but are not limited to methoxy, ethoxy, propoxy (including n-propoxy and isopropoxy), etc.

Unless otherwise specified, "$C_{3-5}$ cycloalkyl" refers to a saturated cyclic hydrocarbon group consisting of 3 to 5 carbon atoms, which is monocyclic systems, and the $C_{3-5}$ cycloalkyl including $C_{3-4}$ and $C_{4-5}$ cycloalkyl, etc.; it may be monovalent, divalent or multivalent. Examples of $C_{3-5}$ cycloalkyl include, but are not limited to, cyclopropyl, cyclobutyl, cyclopentyl, etc.

Unless otherwise specified, $C_{n-n+m}$ or $C_n-C_{n+m}$ includes any specific case of n to n+m carbons, for example, $C_{1-12}$ includes $C_1$, $C_2$, $C_3$, $C_4$, $C_5$, $C_6$, $C_7$, $C_8$, $C_9$, $C_{10}$, $C_{11}$, and $C_{12}$, and any range from n to n+m is also included, for example $C_{1-12}$ includes $C_{1-3}$, $C_{1-6}$, $C_{1-9}$, $C_{3-6}$, $C_{3-9}$, $C_{3-12}$, $C_{6-9}$, $C_{6-12}$, and $C_{9-12}$, etc.; similarly, n-membered to n+m-membered means that the number of atoms on the ring is from n to n+m, for example, 3- to 12-membered ring includes 3-membered ring, 4-membered ring, 5-membered ring, 6-membered ring, 7-membered ring, 8-membered ring, 9-membered ring, 10-membered ring, 11-membered ring, and 12-membered ring, and any range from n to n+m is also included, for example, 3- to 12-membered ring includes 3- to 6-membered ring, 3- to 9-membered ring, 5- to 6-membered ring, 5- to 7-membered ring, 6- to 7-membered ring, 6- to 8-membered ring, and 6- to 10-membered ring, etc.

The structure of the compounds of the present disclosure can be confirmed by conventional methods known to those skilled in the art, and if the present disclosure involves an absolute configuration of a compound, then the absolute configuration can be confirmed by means of conventional techniques in the art. For example, in the case of single crystal X-ray diffraction (SXRD), the absolute configuration can be confirmed by collecting diffraction intensity data from the cultured single crystal using a Bruker D8 venture diffractometer with CuKα radiation as the light source and scanning mode: φ/ω scan, and after collecting the relevant data, the crystal structure can be further analyzed by direct method (Shelxs97) to confirm the absolute configuration.

The compounds of the present disclosure can be prepared by a variety of synthetic methods known to those skilled in the art, including the specific embodiments listed below, the embodiments formed by their combination with other chemical synthesis methods, and equivalent alternatives known to those skilled in the art, preferred implementations include but are not limited to the embodiments of the present disclosure.

The solvent used in the present disclosure is commercially available.

The present disclosure adopts the following abbreviations: aq stands for water; HATU stands for O-(7-azabenzotriazol-1-yl)-N,N,N',N'-tetramethyluronium hexafluorophosphate; eq stands for equivalent; DCM stands for dichloromethane; PE stands for petroleum ether; DMF stands for N,N-dimethylformamide; DMSO stands for dimethyl sulfoxide; EtOAc stands for ethyl acetate; EtOH stands for ethanol; MeOH stands for methanol; CBz stands for benzyloxycarbonyl, which is an amine protecting group; BOC stands for tert-butoxycarbonyl, which is an amine protecting group; r.t. stands for room temperature; O/N stands for overnight; THF stands for tetrahydrofuran; $Boc_2O$ stands for di-tert-butyl dicarbonate; TFA stands for trifluoroacetic acid; DIPEA stands for diisopropylethylamine; $Pd_2(dba)_3$ stands for tris(dibenzylideneacetone)dipalladium.

The compounds of the present disclosure are named according to the conventional naming principles in the art or by ChemDraw® software, and the commercially available compounds use the supplier catalog names.

TECHNICAL EFFECTS

The compound of the present disclosure has an obvious Kappa receptor agonistic effect; it exhibits a very high plasma protein unbounding rate in human and SD rat plasma; the compound of the present disclosure has no risk of related drug interaction; the compound of the present disclosure has good pharmacokinetic properties.

DETAILED DESCRIPTION OF THE PREFERRED EMBODIMENT

The present disclosure is described in detail by the embodiments below, but it does not mean that there are any adverse restrictions on the present disclosure. The compounds of the present disclosure can be prepared by a variety of synthetic methods known to those skilled in the art, including the specific implementations listed below, the implementations formed by their combination with other chemical synthesis methods, and equivalent alternatives known to those skilled in the art, and preferred implementations include but are not limited to the embodiments of the present disclosure. It will be apparent to those skilled in the art that various variations and improvements can be made to specific implementations of the present disclosure without departing from the spirit and scope of the present disclosure.

Reference Embodiment 1: Synthesis of Intermediate M1

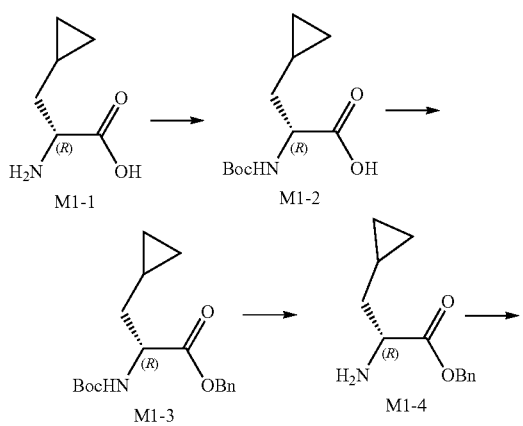

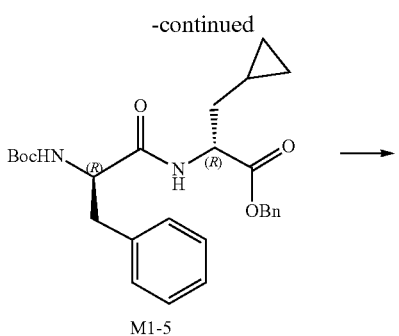

M1-5

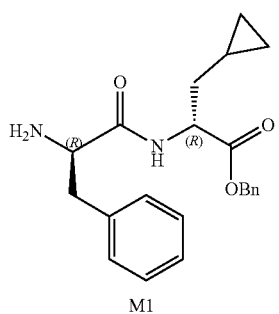

M1

Step 1: Preparation of Intermediate M1-2

Compound M1-1 (1.1 g, 8.52 mmol) was dissolved in 1,4-dioxane (10 mL), and sodium hydroxide (408.80 mg, 10.22 mmol) aqueous solution (10 mL) was added thereto, then di-tert-butyl dicarbonate (2.23 g, 10.22 mmol) was added thereto, and the reaction solution was continued to stir at 20° C. for 15 hours. 30 mL of water was added to the reaction solution, and the pH was adjusted to about 3 with saturated potassium hydrogen sulfate solution; the mixture was extracted with ethyl acetate (50 mL*2), and the organic phases obtained by extraction were combined, washed with 60 mL of saturated brine, and dried over anhydrous sodium sulfate, and then the mixture was filtrated, and the organic solvent was removed under reduced pressure to obtain compound M1-2, and the compound was used directly in the next reaction without further purification. $^1$H NMR (400 MHz, CDCl$_3$) δ: 5.09-5.07 (d, J=8.0 Hz, 1H), 4.28-4.26 (m, 1H), 1.63-1.53 (m, 2H), 1.32 (s, 9H), 0.70-0.58 (m, 1H), 0.42-0.32 (m, 2H), 0.05--0.05 (m, 2H).

The following intermediate was synthesized using the similar method to the intermediate M1-2:

| Intermediate number | Structural formula | Spectrum |
|---|---|---|
| Intermediate M2-2 | (cyclopentyl, BocHN, (R), OH) | $^1$H NMR (400 MHz, CDCl$_3$) δ: 5.08 (d, J = 8.8 Hz, 1H), 4.26 (t, J = 7.6 Hz, 1H), 2.29-2.21 (m, 1H), 1.85-1.55 (m, 6H), 1.45 (s, 9H), 1.40-1.31 (m, 2H). |

Step 2: Preparation of Intermediate M1-3

Intermediate M1-2 (1.95 g, 8.51 mmol) was dissolved in N,N-dimethylformamide (15 mL), and potassium carbonate (1.41 g, 10.21 mmol) and benzyl bromide (1.75 g, 10.21 mmol) were added thereto, and the reaction solution was continued to stir at 20° C. for 15 hours. The reaction solution was diluted with 80 mL of ethyl acetate, washed with water (50 mL*2) and saturated brine (50 mL) in turn, and the mixture was dried over anhydrous sodium sulfate, filtered, and the organic solvent was removed under reduced pressure to obtain a crude product, then the obtained crude product was purified by silica gel column chromatography (eluent: 0 to 10% of ethyl acetate/petroleum ether) to obtain compound M1-3. $^1$H NMR (400 MHz, CDCl$_3$) δ: 7.38-7.25 (m, 5H), 5.12 (d, J=2.4 Hz, 2H), 4.40-4.36 (m, 1H), 1.64-1.60 (m, 2H), 1.39 (s, 9H), 0.68-0.56 (m, 1H), 0.46-0.29 (m, 2H), 0.07--0.08 (m, 2H).

The following intermediate was synthesized using the similar method to the intermediate M1-3:

| Intermediate number | Structural formula | Spectrum |
|---|---|---|
| Intermediate M2-3 | (cyclopentyl, BocHN, (R), OBn) | $^1$H NMR (400 MHz, CDCl$_3$) δ: 7.33-7.19 (m, 5H), 5.19-5.02 (m, 2H), 4.95 (d, J = 8.4 Hz, 1H), 4.21 (t, J = 7.8 Hz, 1H), 2.19-2.08 (m, 1H), 1.61-1.41 (m, 6H), 1.40 (s, 9H), 1.27-1.14 (m, 2H). |

Step 3: Preparation of Intermediate M1-4

Compound M1-3 (2.4 g, 7.51 mmol) was dissolved in ethyl acetate (10 mL), then 4 M of hydrochloric acid-ethyl acetate solution (10 mL) was added thereto, and the reaction solution was continued to react at 20° C. for 0.5 hours. The organic solvent was removed under reduced pressure to obtain the hydrochloride of a crude product of compound M1-4, and the compound was used directly in the next reaction without further purification. $^1$H NMR (400 MHz, CD$_3$OD) δ: 7.32-7.19 (m, 5H), 5.19-5.08 (m, 2H), 4.02 (t, J=6.4 Hz, 1H), 1.82-1.54 (m, 2H), 0.70-0.55 (m, 1H), 0.47-0.32 (m, 2H), 0.08--0.09 (m, 2H).

The following intermediate was synthesized using the similar method to the intermediate M1-4:

| Intermediate number | Structural formula | Spectrum |
|---|---|---|
| Intermediate M2-4 | (cyclopentyl, H$_2$N, (R), OBn) | $^1$H NMR (400MHz, CD$_3$OD) δ: 7.51-7.31 (m, 5H), 5.38-5.23 (m, 2H), 3.98 (d, J = 7.6 Hz, 1H), 3.33 (td, J = 1.6 Hz, J = 3.2 Hz, 1H), 2.43-2.20 (m, 1H), 1.89-1.33 (m, 8H). |

Step 4: Preparation of Intermediate M1-5

The hydrochloride of compound M1-4 (1.9 g, 7.43 mmol) and Boc-D-phenylalanine (1.97 g, 7.43 mmol) were dissolved in N,N-dimethylformamide (20 mL), and then diisopropylethylamine (2.88 g, 22.29 mmol, 3.88 mL) and HATU (4.24 g, 11.14 mmol) were added thereto, and the reaction solution was stirred at 20° C. for 16 hours. The reaction solution was diluted with 80 mL of ethyl acetate, and washed with water (40 mL*2) and saturated brine (50 mL) in turn.

The mixture was dried over anhydrous sodium sulfate, filtered, and the organic solvent was removed under reduced pressure, then the obtained crude product was purified by silica gel column chromatography (eluent: 10 to 25% of ethyl acetate/petroleum ether) to obtain compound M1-5. $^1$H NMR (400 MHz, CDCl$_3$) δ: 7.44-7.21 (m, 10H), 6.53 (d, J=7.2 Hz, 1H), 5.17 (q, J=12.0 Hz, 2H), 5.10-5.00 (m, 1H), 4.72-4.61 (m, 1H), 4.42-4.38 (m, 1H), 3.13-3.02 (m, 2H), 1.79-1.70 (m, 1H), 1.68-1.56 (m, 1H), 1.44 (s, 9H), 0.63-0.49 (m, 1H), 0.46-0.28 (m, 2H), 0.07--0.09 (m, 2H).

The following intermediate was synthesized using the similar method to the intermediate M1-5:

| Intermediate number | Structural formula | Spectrum |
|---|---|---|
| Intermediate M2-5 | ![BocHN-Phe-cyclopentyl-OBn structure] | $^1$H NMR (400 MHz, CDCl$_3$) δ: 7.46-7.16 (m, 10H), 6.33 (d, J = 8.4 Hz, 1H), 5.15 (s, 2H), 4.56-4.52 (m, 1H), 4.38-4.34 (m, 1H), 3.21-2.96 (m, 2H), 2.28-2.12 (m, 1H), 1.64-1.47 (m, 6H), 1.44 (s, 9H), 1.35-1.18 (m, 2H). |

Step 5: Preparation of Intermediate M1

Compound M1-5 (3.4 g, 7.29 mmol) was dissolved in ethyl acetate (30 mL), then 4 M of hydrochloric acid-ethyl acetate solution (30 mL) was added thereto, and the reaction solution was continued to react at 20° C. for 1 hour. The organic solvent was removed under reduced pressure to obtain the hydrochloride of compound M1, and the compound was used directly in the next reaction without further purification. $^1$H NMR (400 MHz, CD$_3$OD) δ: 7.35-7.11 (m, 10H), 5.08 (s, 2H), 4.49-4.46 (m, 1H), 4.09-4.00 (m, 1H), 3.16-3.12 (m, 1H), 2.87-2.84 (m, 1H), 1.92-1.89 (d, J=8.8 Hz, 1H), 1.73-1.50 (m, 2H), 0.79-0.60 (m, 1H), 0.43-0.22 (m, 2H), 0.09--0.12 (m, 2H).

The following intermediate was synthesized using the similar method to the intermediate M1:

| Reference Embodiment | Intermediate number | Structural formula | Spectrum |
|---|---|---|---|
| Reference Embodiment 2 | Intermediate M2 | ![H2N-Phe-cyclopentyl-OBn structure] | $^1$H NMR (400MHz, CD$_3$OD) δ: 7.44-7.24 (m, 10H), 5.24-5.23 (m, 1H), 5.26-5.13 (m, 1H), 4.40 (d, J = 8.4 Hz, 1H), 4.22-4.11 (m, 1H), 3.26-3.15 (m, 1H), 2.95-2.89 (m, 1H), 2.39-2.23 (m, 1H), 1.85-1.53 (m, 6H), 1.47-1.32 (m, 2H). |

Reference Embodiment 3: Synthesis of Intermediate A1

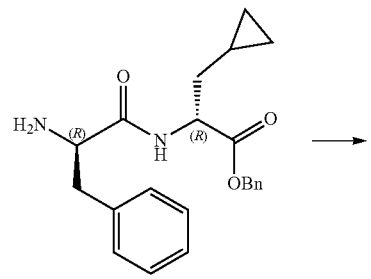

M1

-continued

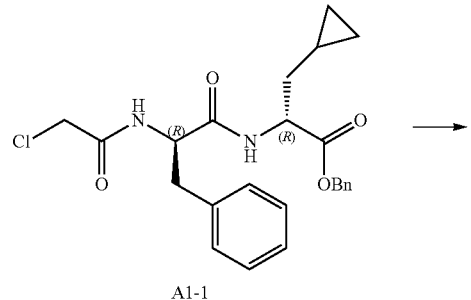

A1-1

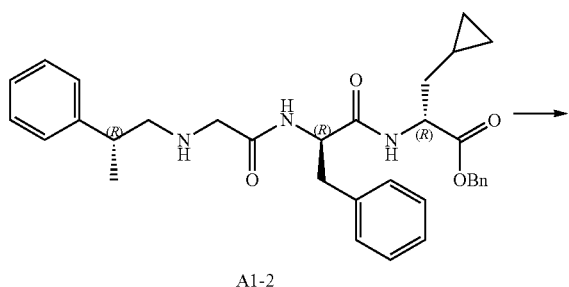

A1-2

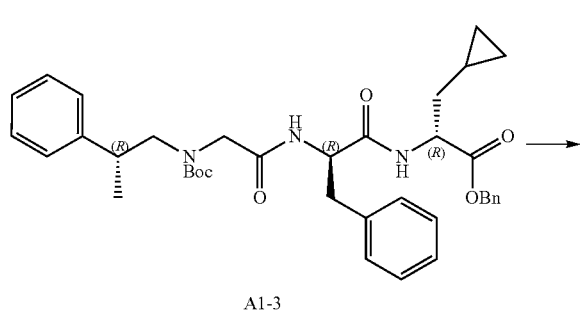

A1-3

Step 1: Preparation of Intermediate A1-1

The hydrochloride of compound M1 (1.2 g, 3.27 mmol) was suspended in dichloromethane (15 mL), and triethylamine (994.08 mg, 9.82 mmol) was added thereto, then chloroacetyl chloride (554.77 mg, 4.91 mmol, 390.68 μL) was slowly added dropwise, and the reaction solution was continued to stir at 20° C. for 18 hours. The reaction solution was diluted with 50 mL of dichloromethane, and washed with 30 mL of saturated ammonium chloride solution and 30 mL of saturated sodium chloride solution in turn. The mixture was dried over anhydrous sodium sulfate, filtered, and the organic solvent was removed under reduced pressure to obtain a crude product of compound A1-1, and the compound was used directly in the next reaction without further purification. $^1$H NMR (400 MHz, CDCl$_3$) δ: 7.51-7.38 (m, 5H), 7.35-7.24 (m, 5H), 6.30 (d, J=7.6 Hz, 1H), 5.38-5.14 (m, 2H), 4.81-4.59 (m, 2H), 3.29-3.02 (m, 3H), 1.83-1.67 (m, 2H), 1.48 (t, J=7.2 Hz, 1H), 0.66-0.50 (m, 1H), 0.45-0.39 (m, 2H), 0.08--0.09 (m, 2H); MS m/z=443.2 [M+H]$^+$.

The following intermediate was synthesized using the similar method to the intermediate A1-1:

| Intermediate number | Structural formula | Spectrum |
|---|---|---|
| Intermediate A2-1 | | MS m/z = 457.1 [M + H]$^+$. |

Step 2: Preparation of Intermediate A1-2

Compound A1-1 (1.42 g, 3.21 mmol) was dissolved in N,N-dimethylformamide (15 mL), and then compound (R)-(+)-β-methylphenethylamine (660.41 mg, 3.85 mmol), potassium iodide (1.06 g, 6.41 mmol) and potassium carbonate (1.33 g, 9.62 mmol) were added thereto, and the reaction solution was continued to stir at 60° C. for 16 hours. The mixture was cooled, and the organic solvent was removed under reduced pressure, and the mixture was added to 30 mL of water, extracted with dichloromethane (30 mL*2). The organic phases obtained by extraction were combined, and washed with saturated brine (30 mL), then the mixture was dried over anhydrous sodium sulfate, filtrated, and the organic solvent was removed under reduced pressure to obtain a crude product of compound A1-2, and the compound was used directly in the next reaction without further purification. MS m/z=542.3 [M+H]$^+$.

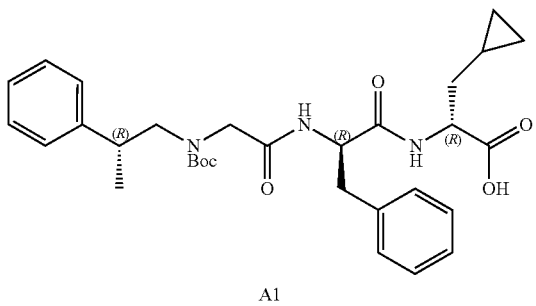

A1

The following intermediate was synthesized using the similar method to the intermediate A1-2:

| Intermediate number | Structural formula | Spectrum |
|---|---|---|
| Intermediate A2-2 | (structure shown) | MS m/z = 556.2 [M + H]+. |

Step 3: Preparation of Intermediate A1-3

Compound A1-2 (1.7 g, 3.14 mmol) was dissolved in dichloromethane (15 mL), and then diisopropylethylamine (1.22 g, 9.42 mmol, 1.64 mL) and Boc anhydride (1.37 g, 6.28 mmol) were added, and the reaction solution was continued to stir at 20° C. for 16 hours. The organic solvent was removed under reduced pressure, and the obtained crude product was purified by silica gel column chromatography (eluent: 10 to 30% of ethyl acetate/petroleum ether) to obtain compound A1-3. $^1$H NMR (400 MHz, CDCl$_3$) δ: 7.46-7.28 (m, 10H), 7.25-7.18 (m, 5H), 6.77-6.32 (m, 2H), 5.25-5.05 (m, 2H), 4.77-4.54 (m, 2H), 3.90-3.06 (m, 7H), 1.75-1.61 (m, 2H), 1.44 (s, 9H), 1.26 (d, J=6.8 Hz, 3H), 0.66-0.48 (m, 1H), 0.41-0.33 (m, 2H), 0.09--0.11 (m, 2H).

The following intermediate was synthesized using the similar method to the intermediate A1-3:

| Intermediate number | Structural formula | Spectrum |
|---|---|---|
| Intermediate A2-3 | (structure shown) | $^1$H NMR (400 MHz, CDCl$_3$) δ: 7.45-7.30 (m, 6H), 7.29-7.15 (m, 9H), 6.78-6.06 (m, 2H), 4.69-4.55 (m, 1H), 4.50-4.46 (m, 1H), 3.81-3.75 (m, 1H), 3.55-3.19 (m, 2H), 3.13-3.01 (m, 4H), 2.22-2.11 (m, 1H), 1.59-1.44 (m, 6H), 1.42 (s, 9H), 1.28-1.10 (m, 5H); MS m/z = 656.3 [M + H]+. |

Step 4: Preparation of Intermediate A1

Compound A1-3 (1.05 g, 1.64 mmol) was dissolved in ethanol (30 mL), then 10% palladium/carbon (150 mg, 155.33 μmol) was added thereto under the protection of nitrogen, and the reaction solution was continued to stir at 20° C. for 15 hours under 15 psi hydrogen pressure. The reaction solution was filtered through diatomite, and the organic solvent was removed under reduced pressure to obtain compound A1, and the compound was used directly in the next reaction without further purification. $^1$H NMR (400 MHz, CDCl$_3$) δ: 7.30-7.09 (m, 10H), 7.00-6.64 (m, 2H), 4.80-4.66 (m, 1H), 4.52-4.44 (m, 1H), 3.83-3.59 (m, 2H), 3.55-2.83 (m, 5H), 1.78-1.52 (m, 2H), 1.36 (s, 9H), 1.18 (d, J=6.8 Hz, 3H), 0.60-0.52 (m, 1H), 0.40-0.30 (m, 2H), 0.05--0.05 (m, 2H).

The following intermediate was synthesized using the similar method to the intermediate A1:

| Reference Embodiment | Intermediate number | Structural formula | Spectrum |
|---|---|---|---|
| Reference Embodiment 4 | Intermediate A2 | | $^1$H NMR (400 MHz, CDCl$_3$) δ: 7.37-7.11 (m, 10H), 6.95-6.44 (m, 2H), 4.77-4.23 (m, 2H), 3.85-3.69 (m, 1H), 3.60-3.33 (m, 2H), 3.30-2.83 (m, 4H), 2.39-2.07 (m, 2H), 1.80-1.48 (m, 5H), 1.40 (s, 9H), 1.33-1.01 (m, 6H); MS m/z = 566.3 [M + H]$^+$. |
Reference Embodiment 5: Synthesis of Intermediate B1
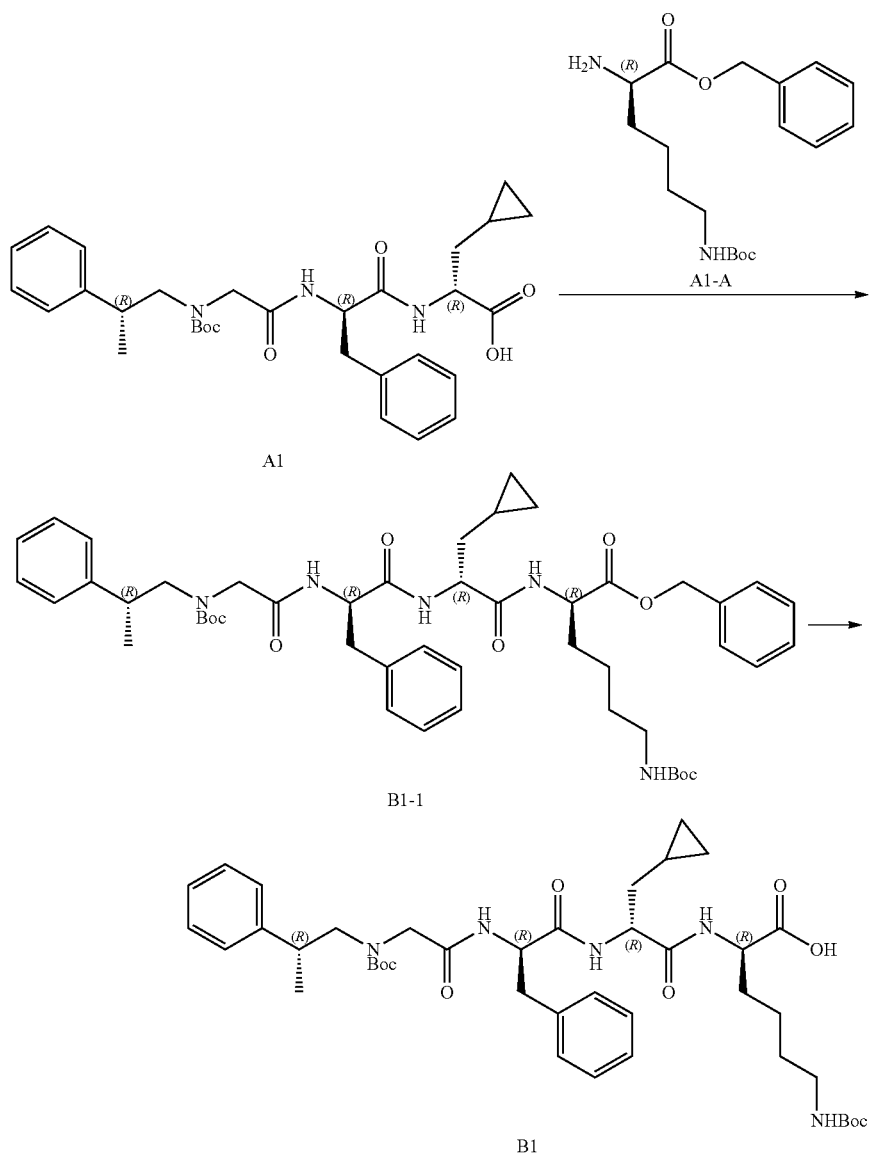

Step 1: Preparation of Intermediate B1-1

Compound A1 (1.9 g, 3.44 mmol) and compound A1-A (1.16 g, 3.44 mmol) were dissolved in DMF (20 mL), and then diisopropylethylamine (1.34 g, 10.33 mmol, 1.80 mL) and HATU (1.96 g, 5.17 mmol) were added thereto, and the reaction solution was continued to stir at 20° C. for 15 hours. The reaction solution was diluted with 150 mL of ethyl acetate, and the organic phase was washed with water (60 mL*2) and saturated brine (80 mL) in turn. The mixture was dried over anhydrous sodium sulfate, filtered, and the organic solvent was removed under reduced pressure to obtain a crude product, and the obtained crude product was purified by silica gel column chromatography (eluent: 10 to 40% of ethyl acetate/petroleum ether) to obtain compound B1-1. MS m/z=870.9 [M+H]$^+$.

Step 2: Preparation of Intermediate B1

Compound B1-1 (1.4 g, 1.61 mmol) was dissolved in ethanol (20 mL), and then palladium/carbon (0.2 g, 10% of purity) was added thereto, and the reaction solution was continued to stir at 20° C. for 15 hours under 15 psi hydrogen pressure. The reaction solution was filtered through diatomite, and the organic solvent was removed under reduced pressure to obtain compound B1, and the compound was used directly in the next reaction without further purification. MS m/z=802.6 [M+Na]$^+$.

Reference Embodiment 6: Synthesis of Intermediate D1

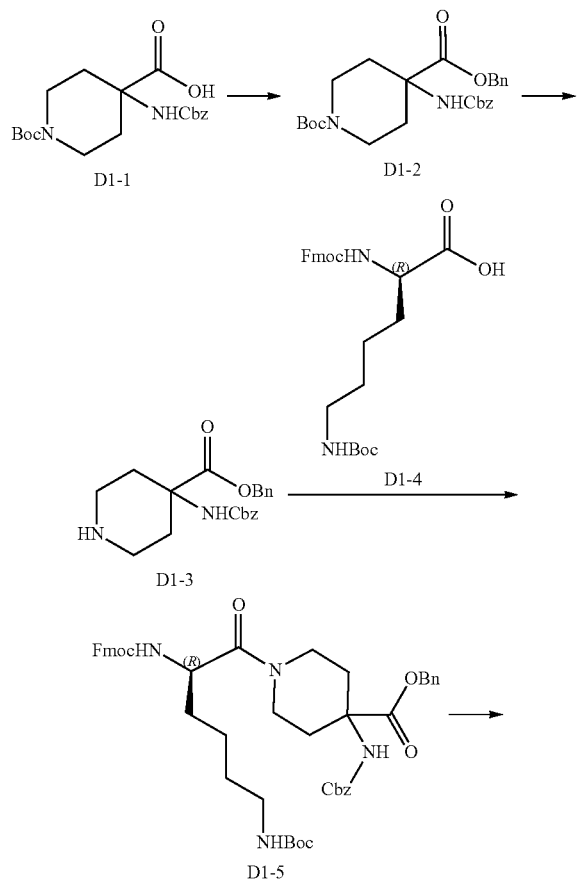

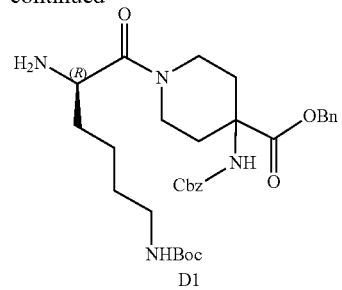

D1

Step 1: Preparation of Intermediate D1-2

Compound D1-1 (3 g, 7.93 mmol) was dissolved in N,N-dimethylformamide (30 mL), and then potassium carbonate (1.31 g, 9.51 mmol) and benzyl bromide (1.63 g, 9.51 mmol, 1.13 mL) were added thereto, and the reaction solution was continued to stir at 20° C. for 15 hours. The reaction solution was added with 50 mL of water, and extracted with ethyl acetate (60 mL*2). The organic phases obtained by extraction were combined, washed with saturated brine (60 mL). The mixture was dried over anhydrous sodium sulfate, filtered, and the organic solvent was removed under reduced pressure to obtain a crude product, then the obtained crude product was purified by silica gel column chromatography (eluent: 5 to 25% of ethyl acetate/petroleum ether) to obtain compound D1-2. $^1$H NMR (400 MHz, CDCl$_3$) δ: 7.33-7.19 (m, 10H), 5.06 (s, 2H), 4.98 (s, 2H), 4.95 (s, 1H), 3.75-3.71 (m, 2H), 3.06-3.00 (m, 2H), 2.02-1.92 (m, 4H), 1.37 (s, 9H).

Step 2: Preparation of Intermediate D1-3

Compound D1-2 (3.7 g, 7.90 mmol) was dissolved in ethyl acetate (10 mL), then 4 M of hydrochloric acid/ethyl acetate (10 mL) was added thereto, and the reaction solution was continued to stir at 20° C. for 1 hour. The organic solvent was removed under reduced pressure to obtain the hydrochloride of compound D1-3, and the compound was used directly in the next reaction without further purification. $^1$H NMR (400 MHz, CDCl$_3$) δ: 7.37-7.31 (m, 10H), 5.16 (s, 2H), 5.06 (s, 2H), 3.37-3.30 (m, 4H), 3.27-3.11 (m, 2H), 2.40-2.21 (m, 4H).

Step 3: Preparation of Intermediate D1-5

The hydrochloride of compound D1-3 (3 g, 7.41 mmol) and compound D1-4 (3.47 g, 7.41 mmol) were dissolved in N,N-dimethylformamide (30 mL), and then diisopropylethylamine (2.87 g, 22.23 mmol, 3.87 mL) and HATU (4.23 g, 11.11 mmol) were added thereto, and the reaction solution was continued to stir at 20° C. for 14 hours. The reaction solution was diluted with 100 mL of ethyl acetate, then washed with water (50 mL*2) and saturated brine (60 mL) in turn. The mixture was dried over anhydrous sodium sulfate, filtered, and the organic solvent was removed under reduced pressure to obtain a crude product, then the obtained crude was purified by silica gel column chromatography (eluent: 15 to 30% of ethyl acetate/petroleum ether) to obtain compound D1-5. $^1$H NMR (400 MHz, CDCl$_3$) δ: 7.78 (d, J=7.4 Hz, 2H), 7.67-7.57 (m, 2H), 7.47-7.28 (m, 14H), 5.84-5.68 (m, 1H), 5.26-5.01 (m, 5H), 4.74-4.53 (m, 2H), 4.39 (d, J=7.0 Hz, 2H), 4.27-4.19 (m, 1H), 4.03-3.57 (m, 2H), 3.51-3.25 (m, 1H), 3.20-3.01 (m, 2H), 2.30-2.14 (m, 2H), 2.02-1.96 (m, 2H), 1.79-1.65 (m, 2H), 1.60-1.30 (m, 14H).

The following intermediate was synthesized using a similar method to the intermediate D1-5:

| Intermediate number | Structural formula | Spectrum |
|---|---|---|
| Intermediate D2-5 | FmocHN—(R)—...—NHBoc (spiro piperidine-azetidine with acetyl) | ¹H NMR (400 MHz, CDCl₃) δ: 7.78 (d, J = 7.6 Hz, 2H), 7.62 (d, J = 7.6 Hz, 2H), 7.46-7.39 (m, 2H), 7.38-7.29 (m, 2H), 5.86-5.76 (m, 1H), 4.73-4.55 (m, 2H), 4.40-4.34 (m, 2H), 4.28-4.17 (m, 1H), 3.93-3.70 (m, 4H), 3.66-3.30 (m, 3H), 3.24-3.04 (m, 3H), 1.91 (d, J = 2.8 Hz, 3H), 1.83-1.52 (m, 8H), 1.44 (s, 9H). |

Step 4: Preparation of Intermediate D1

Compound D1-5 (3 g, 3.66 mmol) was dissolved in dichloromethane (15 mL), and then piperidine (3.12 g, 36.63 mmol, 3.62 mL) was added thereto, and the reaction solution was continued to stir at 20° C. for 16 hours. The organic solvent was removed under reduced pressure, and 30 mL of acetonitrile was added to slurry, then the mixture was filtered, and the filtrate was evaporated to dryness by rotary evaporation, then the obtained crude product was purified by silica gel column chromatography (eluent: 35% of ethyl acetate/petroleum ether to 10% of methanol/dichloromethane) to obtain the hydrochloride of compound D1. ¹H NMR (400 MHz, CDCl₃) δ: 7.41-7.29 (m, 10H), 5.16 (s, 2H), 5.08 (s, 2H), 4.62-4.58 (m, 1H), 3.75-3.60 (m, 2H), 3.43-3.08 (m, 4H), 2.29-2.13 (m, 2H), 2.05-1.87 (m, 2H), 1.68-1.54 (m, 4H), 1.54-1.39 (m, 15H); MS m/z=597.3 [M+H]⁺.

The following intermediate was synthesized using the similar method to the intermediate D1:

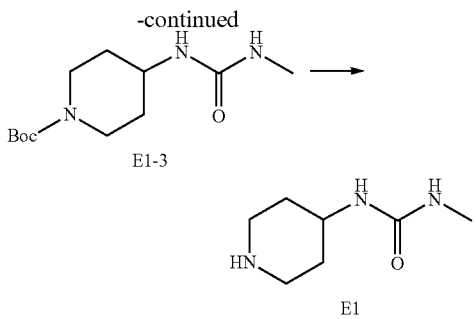

Step 1: Preparation of Intermediate E1-2

Compound E1-1 (2 g, 9.99 mmol) and pyridine (880.00 mg, 11.13 mmol, 897.96 μL) were dissolved in tetrahydro-

| Reference Embodiment | Intermediate number | Structural formula | Spectrum |
|---|---|---|---|
| Reference Embodiment 7 | Intermediate D2 | H₂N—(R)—...—NHBoc (spiro piperidine-azetidine with acetyl) | ¹H NMR (400 MHz, CDCl₃) δ: 4.66 (s, 1H), 3.88 (d, J = 3.6 Hz, 2H), 3.78-3.74 (m, 1H), 3.76 (d, J = 4.2 Hz, 2H), 3.60-3.56 (m, 1H), 3.49-3.33 (m, 2H), 3.24-3.09 (m, 3H), 2.70-2.64 (m, 2H), 1.91 (s, 3H), 1.88-1.73 (m, 4H), 1.72-1.50 (m, 4H), 1.47-1.43 (m, 2H), 1.45 (s, 9H); MS m/z = 397.3 [M + H]⁺. |

Reference Embodiment 8: Synthesis of Intermediate E1

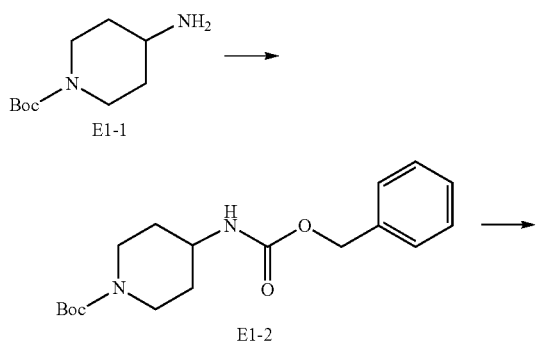

furan (45 mL), then phenyl chloroformate (1.56 g, 9.99 g, 1.25 mL) was added dropwise at 0° C. under the protection of nitrogen, and the reaction solution was continued to react at 20° C. for 2 hours after the addition was completed. After the reaction was completed, the organic solvent was removed under reduced pressure, and the crude product was diluted with ethyl acetate, and then washed with water and saturated brine. The mixture was dried over anhydrous sodium sulfate, filtered, and the organic solvent was removed under reduced pressure, and the obtained crude product was purified by column chromatography (petroleum ether:ethyl acetate=5:1) to obtain compound E1-2. MS m/z=301.9 [M-56+Na]⁺.

Step 2: Preparation of Intermediate E1-3

Compound E1-2 (0.6 g, 1.87 mmol) was dissolved in methanol (15 mL), and then methylamine solution (2 M, 842.74 μL) was added thereto, and the temperature was raised to 50° C. and the reaction was continued to react for 15 hours after the addition was completed. The mixture was cooled, and the organic solvent was removed under reduced pressure, and then the obtained crude product was purified by column chromatography (petroleum ether:ethyl acetate=1:1) to obtain compound E1-3. $^1$H NMR (400 MHz, CDCl$_3$) δ: 4.26-4.10 (m, 2H), 4.03-3.80 (m, 2H), 3.75-3.61 (m, 1H), 2.79 (br t, J=12.4 Hz, 2H), 2.70 (d, J=4.8 Hz, 3H), 1.91-1.80 (m, 2H), 1.38 (s, 9H).

Step 3: Preparation of Intermediate E1

Compound E1-3 (249.03 mg, 967.73 μmol) was dissolved in ethyl acetate (3 mL), and then hydrochloric acid-ethyl acetate solution (4 M, 2.42 mL) was added thereto, and the reaction solution was continued to react at 20° C. for 1 hour after the addition was completed. The organic solvent was removed under reduced pressure, and the obtained crude product was purified by column chromatography (petroleum ether:ethyl acetate=5:1) to obtain the hydrochloride of compound E1. $^1$H NMR (400 MHz, CD$_3$OD) δ: 3.84-3.70 (m, 1H), 3.41 (br d, J=13.2 Hz, 2H), 3.17-3.05 (m, 2H), 2.72 (s, 3H), 2.12 (br dd, J=3.2, 14.0 Hz, 2H), 1.75-1.62 (m, 2H); MS m/z=158.1[M+H]$^+$.

Embodiment 1: Preparation of Compound 1

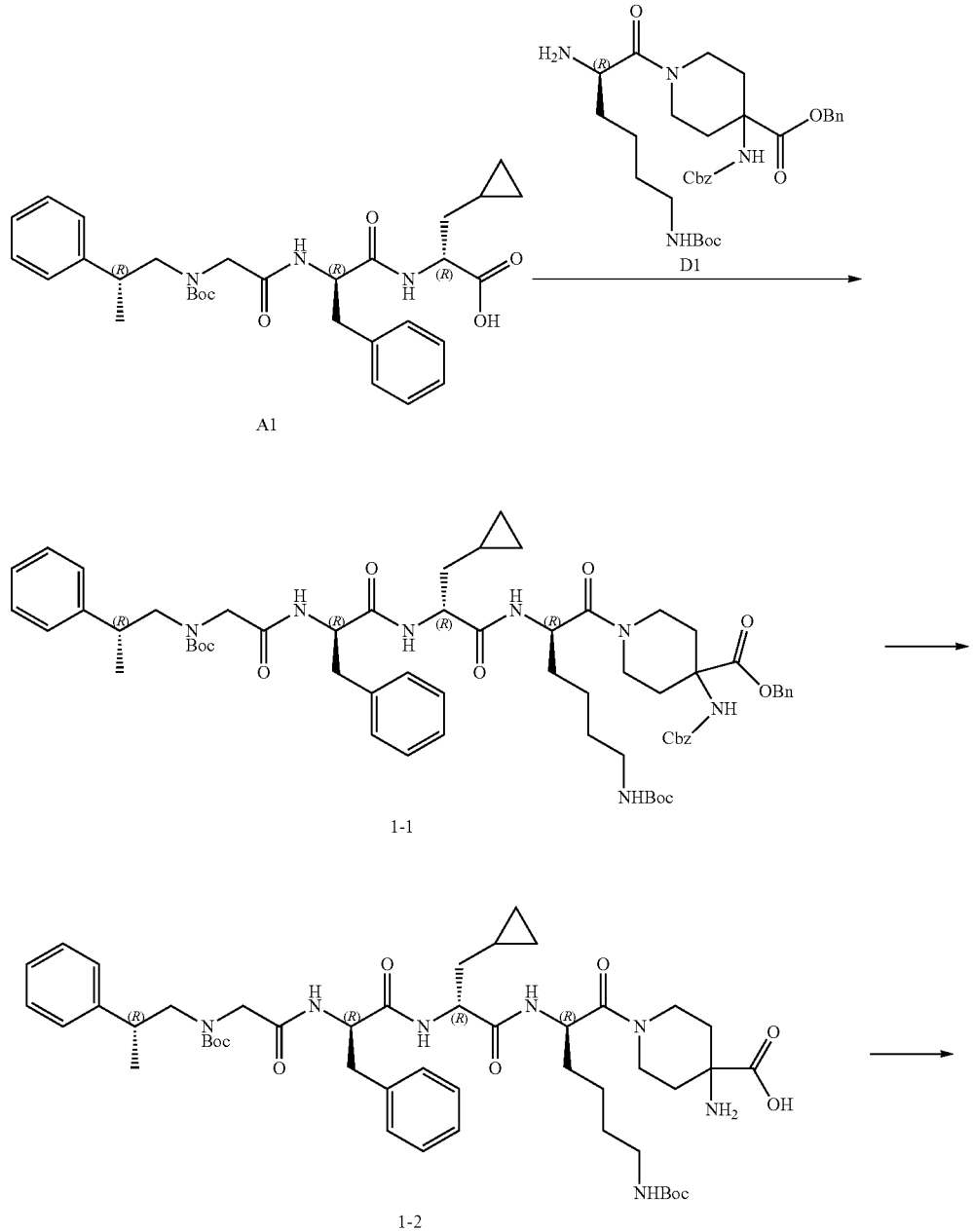

-continued

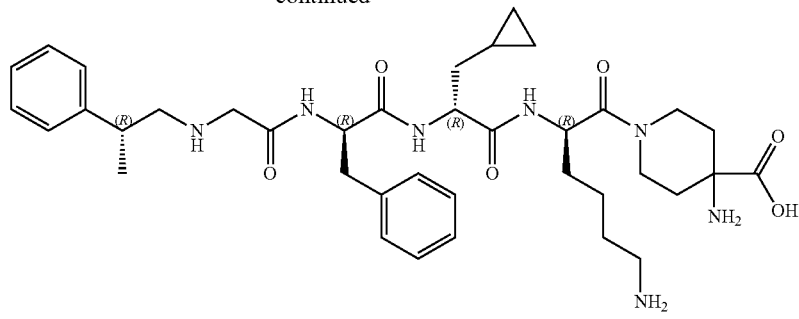

Step 1: Preparation of Intermediate 1-1

Compound A1 (220 mg, 398.79 μmol) and compound D1 (237.96 mg, 398.79 μmol) were dissolved in N,N-dimethylformamide (5 mL), and then diisopropylethylamine (154.62 mg, 1.20 mmol, 208.38 μL) and HATU (227.45 mg, 598.18 μmol) were added thereto, and the reaction solution was continued to stir at 20° C. for 16 hours. The reaction solution was diluted with 60 mL of ethyl acetate, washed with water (30 mL*2) and saturated brine (40 mL) in turn. The mixture was dried over anhydrous sodium sulfate, filtered, and the organic solvent was removed under reduced pressure, then the obtained crude was purified by silica gel column chromatography (eluent: 50% of ethyl acetate/petroleum ether to 5% of methanol/dichloromethane) to obtain compound 1-1. MS m/z=1130.6 [M+H].

The following intermediate was synthesized using the similar method to the intermediate 1-1:

| Intermediate number | Structural formula | Spectrum |
|---|---|---|
| Intermediate 2-1 | (structure shown) | MS m/z: 1144.7 [M + H]⁺. |

Step 2: Preparation of Intermediate 1-2

Compound 1-1 (200 mg, 176.93 μmol) was dissolved in ethanol (10 mL), and then 10% palladium/carbon (20 mg, 176.93 μmol) was added thereto, and the reaction solution was continued to stir at 20° C. for 15 hours under 15 psi hydrogen pressure. The reaction solution was filtered through diatomite, and the organic solvent was removed under reduced pressure to obtain compound 1-2, and the compound was used directly in the next reaction without further purification. MS m/z=906.6 [M+H]⁺.

The following intermediate was synthesized using the similar method to the intermediate 1-2:

| Intermediate number | Structural formula | Spectrum |
|---|---|---|
| Intermediate 2-2 | 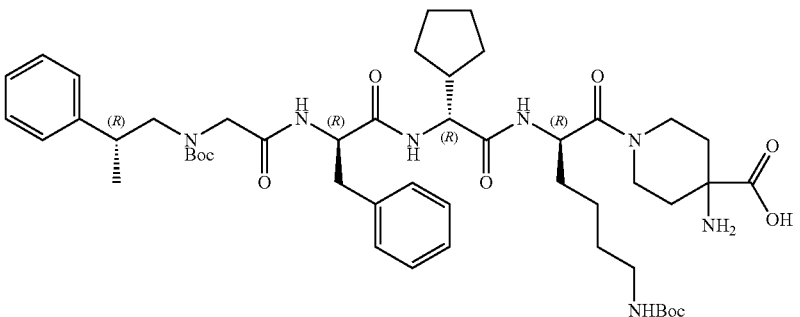 | MS m/z: 920.6 [M + H]+. |

Step 3: Preparation of Compound 1

Compound 1-2 (155 mg, 171.06 μmol) was dissolved in ethyl acetate (5 mL), then 4 M of hydrochloric acid/ethyl acetate (5 mL) was added thereto, and the reaction solution was continued to stir at 20° C. for 0.5 hours. Most of the solvent was removed under reduced pressure, and 20 mL of ethyl acetate was added to slurry, then the mixture was filtered, and the crude product of the filter cake was purified by high performance liquid chromatography (column: Venusil ASB Phenyl 150*30 mm*5 μm; mobile phase: [water (0.05% hydrochloric acid)-acetonitrile]; B (acetonitrile) %: 8% to 38%, 9 minutes) to obtain the hydrochloride of compound 1. $^1$H NMR (400 MHz, CD$_3$OD) δ: 7.26-7.08 (m, 9H), 7.07-6.97 (m, 1H), 4.62-4.50 (m, 1H), 4.31-4.18 (m, 1H), 4.08-3.83 (m, 1H), 3.80-3.49 (m, 4H), 3.25-3.24 (m, 1H), 3.12-2.88 (m, 4H), 2.86-2.68 (m, 3H), 2.25-2.03 (m, 2H), 1.93-1.50 (m, 7H), 1.49-1.25 (m, 4H), 1.24-1.15 (m, 3H), 0.77-0.56 (m, 1H), 0.49-0.23 (m, 2H), 0.12--0.10 (m, 2H); MS m/z=706.4 [M+H]+.

The following compound was synthesized using the similar method to the compound 1:

| Embodiment | Intermediate number | Structural formula | Spectrum |
|---|---|---|---|
| 2 | Compound 2 | 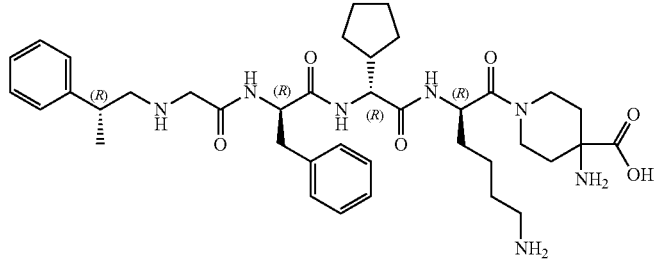 | $^1$H NMR (400MHz, CD$_3$OD) δ: 7.43-7.34 (m, 2H), 7.33-7.24 (m, 7H), 7.19-7.13 (m, 1H), 4.78-4.67 (m, 1H), 4.21-4.00 (m, 2H), 3.98-3.85 (m, 2H), 3.81-3.65 (m, 2H), 3.50-3.36 (m, 1H), 3.25-3.05 (m, 4H), 3.01-2.81 (m, 3H), 2.40-2.19 (m, 3H), 2.09-1.79 (m, 4H), 1.78-1.43 (m, 12H), 1.38-1.31 (m, 4H); MS m/z = 720.4 [M + H]+. |

Embodiment 3: Preparation of Compound 3

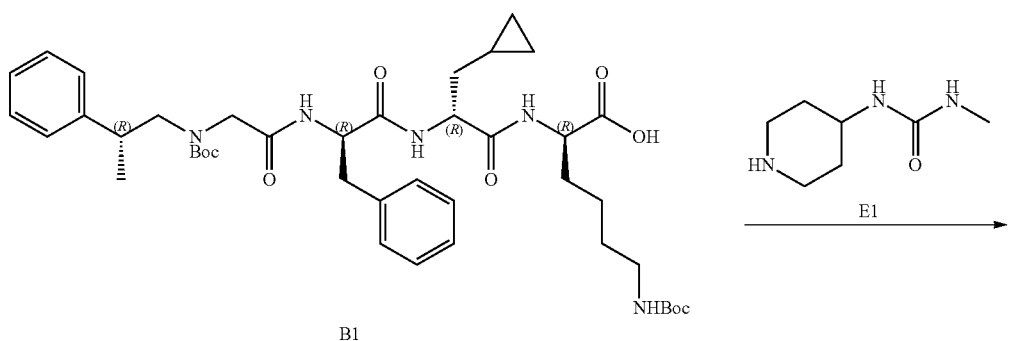

B1

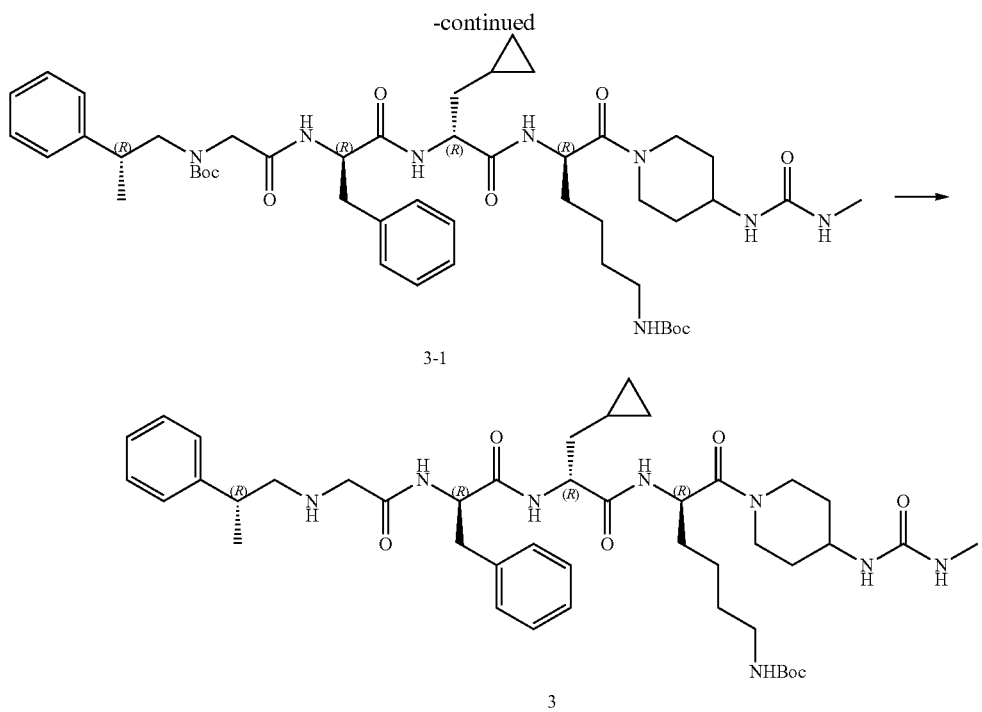

Step 1: Preparation of Intermediate 3-1

Compound B1 (0.2 g, 256.42 μmol) and the hydrochloride of compound E1 (70.81 mg, 307.71 μmol) were dissolved in DMF (5 mL), and then HATU (146.25 mg, 384.64 μmol) and diisopropylethylamine (99.42 mg, 769.27 μmol, 133.99 μL) were added thereto, and the reaction solution was continued to stir at 20° C. for 15 hours. The reaction solution was diluted with 50 mL of ethyl acetate, and the organic phase was washed with water (30 mL*2) and saturated brine (30 mL) in turn. The mixture was dried over anhydrous sodium sulfate, filtered, and the organic solvent was removed under reduced pressure, then the obtained crude product was purified by silica gel column chromatography (eluent: 0 to 5% of methanol/dichloromethane) to obtain compound 3-1. MS m/z=919.6 [M+H]⁺.

The following intermediate was synthesized using the similar method to the intermediate 3-1:

Step 2: Preparation of Compound 3

Compound 3-1 (0.19 g, 206.71 μmol) was dissolved in ethyl acetate (4 mL), and hydrogen chloride-ethyl acetate solution (4 M, 2 mL) was added thereto, and the reaction solution was continued to stir at 20° C. for 2 hours. The organic solvent was removed under reduced pressure, and the crude product was purified by high performance liquid chromatography (column: Venusil ASB Phenyl 150*30 mm*5 μm; mobile phase: [water (0.05% HCl)-ACN]; B (acetonitrile) %: 15%-45%, 9 min) to obtain compound 3. $^1$H NMR (400 MHz, METHANOL-$d_4$) δ: 7.41-7.37 (m, 2H), 7.33-7.26 (m, 7H), 7.20-7.11 (m, 1H), 4.77-4.69 (m, 1H), 4.45-4.27 (m, 2H), 4.08-3.94 (m, 1H), 3.91-3.82 (m, 1H), 3.81-3.74 (m, 1H), 3.68 (br d, J=15.6 Hz, 1H), 3.24 (br dd, J=4.0, 14.0 Hz, 2H), 3.18-3.05 (m, 3H), 3.01-2.86 (m, 4H), 2.73 (s, 3H), 2.03-1.88 (m, 2H), 1.83-1.67 (m, 6H), 1.58 (td, J=6.8, 14.0 Hz, 1H), 1.47 (br s, 3H), 1.38-1.32 (m, 4H), 0.79 (br d, J=7.2 Hz, 1H), 0.56-0.41 (m, 2H), 0.23-0.10 (m, 2H); MS m/z=719.2[M+H]⁺.

| Intermediate number | Structural formula | Spectrum |
|---|---|---|
| Intermediate 4-1 | | MS m/z: 930.6 [M + H]⁺. |

The following compound was synthesized using the similar method to the compound 3:

| Embodiment | Intermediate number | Structural formula | Spectrum |
|---|---|---|---|
| 4 | Compound 4 | (structure shown) | $^1$H NMR (400 MHz, CD$_3$OD) δ: 7.26-7.22 (m, 2H), 7.18-7.11 (m, 7H), 7.10-7.01 (m, 1H), 4.24-4.23 (m, 1H), 3.85-3.81 (m, 2H), 3.65-3.44 (m, 6H), 3.31-3.30 (m, 2H), 3.10-2.98 (m, 5H), 2.77-2.70 (m, 3H), 1.75-1.70 (m, 2H), 1.62-1.50 (m, 9H), 1.45-1.35 (m, 3H), 1.19-1.17 (m, 3H), 0.63-0.61 (m, 1H), 0.36-0.29 (m, 2H), 0.01-0.00 (m, 2H).; MS m/z = 730.5 [M + H]$^+$. |

Experimental Embodiment 1: cAMP Test of Kappa Receptor

Solution and Buffer:

Experimental buffer: 1*HBSS (+/+) (SIGMA #H1387)+ 20 mM HEPES (LONZA #17-737E)

Stimulation buffer (STB): 200 μM IBMX (SIGMA #I7018) and 3 μM NKH477 (SIGMA #N3290) experimental buffer Experimental Methods and Steps Preparation of Compound The compound powder was dissolved with DMSO (Amresco #0231), and the concentration of the compound solution was 10 mM. 1 μL of the test compound was taken, and 49 μL of DMSO was added thereto, and the mixture was diluted to 200 μM of solution.

A LDV 384-well plate was taken, and the compound solution diluted in the previous step was respectively added to wells A1 to H1; a pre-prepared 200 μM of U-50488 (Tocris #0495/25) was taken and added to well P1; 10.8 μL of DMSO was added to each well of A2 to A11, B2 to H22, and P2 to P11, respectively, and the mixture was centrifuged at 1000 rpm for 30 seconds.

Continuous gradient dilutions of compounds were performed with bravo, and the first column of LDV plate prepared in the previous step was taken as the initial concentration column, and 5 μL was sucked into the next column each time and blown and mixed evenly.

After the dilution was completed, 10 μL 200 μM of U-50488 was added to well A24 as HPE (100% inhibition rate activity), and 10 μL of DMSO was added to well P24 as ZPE (0% inhibition rate activity), and the mixture was centrifuged at 1000 rpm for 30 seconds.

According to the experimental layout, the compound solution diluted in the previous step was transferred to the experimental plate Corning 3824 with Echo 550, 50 nL per well.

Experimental Steps

A set of frozen KOR cAMP cells was taken from the −80° C. refrigerator and thawed in a 37° C.-water bath.

After thawing, the cells in the tube were aspirated into a 15 mL centrifuge tube, and 4 mL of experimental buffer was added thereto.

The mixture was centrifuged at 1000 rpm for 5 min, and the supernatant was discarded, and then another 5 mL of experimental buffer was added thereto, and the mixture was blown and mixed well gently with pipette.

Cell density was counted and adjusted on a cell counter to 1.5*10$^6$ cells/mL.

STB was added to the experimental plates containing the compound with Multidrop Combi, 5 μL per well.

The prepared cell suspension was added to the experimental plates containing the compound with Multidrop Combi, 5 μL per well.

The mixture was centrifuged at 300 rpm for 30 seconds and incubated in a 37° C. incubator for 40 minutes.

A standard curve of cAMP was prepared, and a pre-prepared and sub-packed frozen 2848 nM cAMP solution was thawed, and 2848 nM was used as the highest concentration point for 4 times continuous gradient dilution, with a total of 16 concentration points.

The diluted cAMP solution was then transferred to a new Corning 3824 experiment plate with a multichannel pipettor at 10 μL per well in triplicate.

After 40 min of incubation, D2 (Cisbio #62AM4PEJ) was added to the experimental plate (including the standard curve experiment plate) with Multidrop Combi at 5 μL per well.

Ac (Cisbio #62AM4PEJ) was added to the experimental plate (including the standard curve experimental plates) with Multidrop Combi, 5 μL per well, and incubated for 60 min at room temperature.

Experimental plates were read with Envision.

Experimental Results

The results are shown in Table 1.

TABLE 1

| EC$_{50}$ value of the compound to Kappa receptor | |
|---|---|
| Compound number | EC$_{50}$ (nM) |
| Compound 1 | 0.085 |
| Compound 2 | 0.311 |
| Compound 3 | 0.040 |
| Compound 4 | 0.034 |

The results show that the compound of the present disclosure has an obvious Kappa receptor agonistic effect.

Experimental Embodiment 2: Plasma Protein Binding Rate (PPB) Test

1. Experimental Objectives

To test the protein binding rate of the test compound in human and SD rat plasma.

2. Experimental Method

2.1 Preparation of Plasma

The frozen plasma was thawed in flowing cold tap water, and then the plasma was centrifuged at 3220×g for 5 minutes to remove the suspension and precipitate. The pH of plasma was determined, and only the plasma with a pH between 7.0 to 8.0 could be used for experiments.

2.2 Preparation of Solution

| Solution name | Composition | pH | Storage condition |
|---|---|---|---|
| Working solution | 2 µM of DMSO solution of test compound and control compound | ND | 2-8° C. |
| Blank plasma | Sprague-Dawley rat, human | Between 7.0 to 8.0 | Below −30° C. |
| Dialysis buffer | 100 mM sodium phosphate and 150 mM sodium chloride buffer | 7.4 ± 0.1 | 2-8° C. |
| Plasma containing test compound or control compound | 2 µM of plasma sample of test compound or control compound | ND | Room temperature |

2.3 Experimental Operation

The experiment was used a 96-well balanced dialysis plate (HTDialysis device) to determine the plasma protein binding rate of the test compound and control compound. Before the experiment was started, the dialysis membrane was pretreated according to the description, and then the dialysis device was assembled as required. The blank plasma of human and SD rats (plasma purchased from BioreclamationIVT) was taken, and the test compound working solution or the warfarin working solution was added to make the final concentration of the test compound and warfarin in the plasma samples both 2 µM. The sample was mixed well. 50 µL of the test compound and warfarin plasma sample were removed into the sample receiving plate, and the corresponding volume blank plasma or buffer was immediately added, so that the final volume of each sample well was 100 µL, and the volume ratio of the plasma:the dialysis buffer was 1:1, and the termination solution was added to these $T_0$ samples of the test compound and the control compound. The plate was sealed and shaken at 800 rpm for 10 minutes. Then, these $T_0$ samples were stored at 2 to 8° C. together with other dialyzed samples, waiting for after-treatment together with other dialyzed samples; 150 µL of test compound and warfarin plasma sample were added to the administration end of each dialysis well, and 150 µL of blank dialysis buffer was added to the corresponding receiving end of each dialysis well. Then, the dialysis plate was sealed with a gas permeable membrane, and then placed in a moist 5% $CO_2$ incubator, and incubated with shaking at 37° C. and 100 rpm for 4 hours. At the end of dialysis, 50 µL of sample aliquots from the buffer side and plasma (matrix) side of the dialysis device were put into a new 96-well plate (sample collection plate). An equal volume of relative blank matrix (buffer or plasma) was added to each sample to reach a final volume of 100 µL, and the volume ratio of the plasma (matrix):the dialysis buffer in each well was 1:1 (v:v). All samples were further treated by protein precipitation for LC/MS/MS analysis. The unbound rate (Unbound) %, bound rate (Bound) % and recovery rate (Recovery) % of the compound were calculated by the following formula:

% Unbound=100*$F_C/T_C$,

% Bound=100−% Unbound,

% Recovery=100*$(F_C+T_C)/T_0$.

Where $F_C$ is the concentration of the compound at the buffer end of the dialysis plate; $T_C$ is the concentration of the compound at the plasma end of the dialysis plate; $T_0$ is the concentration of the compound in the plasma sample at time zero.

3. Experimental Results

The results are shown in Table 2.

TABLE 2

| Unbound rates of the compound in human and rat plasma | | |
|---|---|---|
| Compound | Unbound rate in plasma | |
| number | Human plasma | SD rat plasma |
| Compound 1 | 55.2% | 44.7% |

Conclusion: The compound of the present disclosure shows very high plasma protein unbounding rate in human and SD rat plasma.

Experimental Embodiment 3: Cytochrome P450 Isoenzyme Inhibition Activity Test

1. Experimental Objectives

To test the inhibitory activities of test compound against different subtypes of human cytochrome P450 isoenzymes

2. Experimental Method

The test compound, standard inhibitor (100× final concentration) and mixed substrate working solution were prepared; and the microsomes (purchased from Corning Inc) frozen in the −80° C. refrigerator were taken out and thawed. 20 µL of the test compound and standard inhibitor solution were added to the corresponding well position, and at the same time, 20 µL of the corresponding solvent was added to the control well position (NIC) without inhibitor and the blank control well position (Blank) without inhibitor; secondly, 20 µL of mixed substrate solution was added to the corresponding well position except the Blank well position (20 µL of PB was added to the Blank well position); human liver microsome solution was prepared (the solution was put back in the refrigerator immediately after marking the date after use), and then 158 µL of human liver microsome solution was added to all well positions; the sample plate was put in a 37° C.-water bath for pre-incubation, and then a coenzyme factor (NADPH) solution was prepared; after 10 minutes, 20 μL of NADPH solution was added to all wells, and then the sample plate was shaken well, and incubated in a 37° C.-water bath for 10 minutes; at the corresponding time point, 400 μL of cold acetonitrile solution (internal standard was 200 ng/mL tolbutamide and labetalol) was added to stop the reaction; after the sample plates were mixed well, the mixture was centrifuged at 4000 rpm for 20 minutes to precipitate protein; 200 μL of supernatant was added into 100 μL of water, and the mixture was shaken well and sent to LC/MS/MS for detection.

3. Experimental Results

The results are shown in Table 3.

TABLE 3

| IC$_{50}$ value of compound for P450 isoenzyme inhibition | | | | |
|---|---|---|---|---|
| Compound | Cytochrome P450 isoenzyme IC$_{50}$ (nM) | | | |
| number | CYP1A2 | CYP2C9 | CYP2C19 | CYP2D6 | CYP3A4-M |
| Compound 1 | >50 | >50 | >50 | >50 | >50 |

Experimental conclusion: The inhibitory IC$_{50}$ of CYP1A2, CYP2C9, CYP2C19, CYP2D6 and CYP3A4-M are greater than 50 μM, and there is no risk of related drug interaction.

Experimental Embodiment 4: Metabolic Stability (HMS) Study in Hepatocytes

1. Experimental Objectives

To test the metabolic stability of the test compound in human and rat hepatocytes.

2. Experimental Materials 2.1 Test Compound (10 mM), Reference Substance: 7-Ethoxycoumarin, 30 mM, 7-Hydroxycoumarin, Reference Substance, 30 mM
2.2 Cells

| Hepatocyte | Cell viability | Supplier Cat No. |
|---|---|---|
| Rat hepatocyte | 85% | BioreclamationIVTM00005 |
| Human hepatocyte | 84% | BioreclamationIVTX008001 |

2.3 Buffer System:
Culture medium for thawing: Williams' E medium containing 5% fetal bovine serum and 30% Percoll solution and other auxiliary materials.
Culture medium for incubation: Williams' E medium (without phenol red), wherein containing 2 mM L-glutamine and 25 mM of hydroxyethyl piperazine ethanesulfonic acid.
Termination solution: acetonitrile containing 200 ng/mL of tolbutamide and labetalol as internal standard.
Dilution solution: ultrapure water.

3. Experimental Method

1) An accurate amount of positive control compound was dissolved in dimethyl sulfoxide (DMSO) to prepare a 30 mM solution.

2) 10 mM of test compound and 30 mM of positive control compound were diluted to 1 mM and 3 mM with DMSO on a 96-well plate.
3) 1 mM of test compound and 3 mM of positive control compound were diluted to 100 μM and 300 μM quantitative solution with acetonitrile.
4) The frozen cells were melted, separated and suspended in the culture medium, and then diluted to 0.5×10$^6$ cells/mL with preheated culture solution.
5) 198 μL of preheated cell suspension was added to a 96-well plate.
6) 100 μL of termination solution was transferred to a set of pre-labeled 96-well plates (acetonitrile containing 200 ng/mL tolbutamide and 200 ng/mL labetalol as internal standards).
7) 2 μL 100 μM of test compound or 300 μM positive control quantitative solution was added in duplicate to each well of a 96-well plate.
8) For T$_0$ samples, the samples were mixed to achieve uniform suspension for about 1 minute, then immediately transferred 20 μL of each sample to a well containing 100 μL of ice-cold termination solution, and then mixed well.
9) All plates were incubated at 37° C. in 5% CO$_2$ in a 95% humidified incubator, and the reaction was started with a constant shaking of about 600 rpm.
10) At 15, 30, 60 and 90 min, the samples were mixed, then 20 μL of each sample was transferred to wells containing 100 μL of ice-cold termination solution at each time point and then mixed.
11) Culture medium control (MC) sample plates (labeled as T$_0$-MC and T$_{90}$-MC) were prepared at T$_0$ and T$_{90}$ by adding the same ingredients except for the cell suspension in each well. The final concentration table was generated.
12) At each corresponding time point, the reaction was stopped by removing the plate from the incubator and mixed with 100 μL of ice-cold termination solution.
13) The plate was immediately shaken at a 500 rpm vortex on a plate oscillator for 10 minutes. Then, all sample plates were centrifuged at 3220×g at 4° C. for 20 minutes.
14) After centrifugation, the supernatant from the 35 μL/well sample plate was transferred to another set of pre-labeled 96-well plates containing 70 μL of ultrapure water according to the plate chart.
15) The analysis plate was sealed and stored at 4° C. until LC-MS-MS analysis.

The residual rate of the test compound and control compound was obtained by the following formula:

$$\text{Residual rate (\%)} = \frac{\text{Ratio of peak area of compound to internal standard at any time point}}{\text{Ratio of peak area of compound to internal standard at 0 min}} \times 100\%$$

The elimination rate constant k of the test compound and the control compound in hepatocyte was calculated by plotting the logarithm of the time to the residual rate, and the half-life ($T_{1/2}$) and the intrinsic clearance rate in vitro ($CL_{int}$) were obtained by the elimination rate constant k with the following formula:

$T_{1/2}=0.693/k$ $CL_{int}$(hep)=k/number of cells per mL(million cells/mL)

$CL_{int}$(liver)=$CL_{int}$(hep)×ratio of liver weight to body weight×number of hepatocytes per gram of liver The parameters for the various species in the formula are listed below:

| Specie | Ratio of liver weight to body weight (g/kg Body Weight) | Hepatic blood flow ($Q_h$) (mL/min/kg) | Number of hepatocytes (of cells/g liver) |
|---|---|---|---|
| Mice | 88 | 90.0 | $135 \times 10^6$ |
| Rat | 40 | 55.2 | $117 \times 10^6$ |
| Dog | 32 | 30.9 | $215 \times 10^6$ |
| Monkey | 30 | 43.6 | $120 \times 10^6$ |
| Human | 20 | 20.7 | $139 \times 10^6$ |

4. Experimental Results

The results are shown in Table 4.

TABLE 4

| Compound number | Intrinsic clearance rate of compound in human and rat liver | |
|---|---|---|
| | Intrinsic clearance rate in liver (mL/min/Kg) | |
| | Human | Rat |
| Compound 1 | <17.8 | <29.9 |

Experimental conclusion: The compound of the present disclosure has low clearance in both human and rat.

Experimental Embodiment 5: In Vivo Pharmacokinetic Study in SD Rats

1. Experimental Objectives

To test the in vivo pharmacokinetics of test compound in SD rats

2. Experimental Materials

Sprague Dawley rats (male, 6 to 10 weeks old, purchased from Beijing Vital River Laboratory Animal Co., LTD)

3. Experimental Method

Compound 1 was mixed with normal saline to prepare a clear solution of 1 mg/mL for injection group administration, filtered by microporous membranes and ready for use. The test compound was administered intravenously at 3 mg/kg, and the solvent for intravenous administration was normal saline. Plasma samples were collected at 0, 0.083, 0.25, 0.5, 1.0, 2.0, 4.0, 8.0 and 24 hours after administration. The plasma concentration was determined by LC-MS/MS method, and the relevant pharmacokinetic parameters were calculated by non-compartmental model linear logarithmic trapezoidal method using WinNonlin™ Version 6.3 (Pharsight, Mountain View, CA) pharmacokinetic software.

4. Experimental Results

The experimental results are shown in Table 5 below:

TABLE 5

| | Pharmacokinetic data of compound 1 in rats | | | | |
|---|---|---|---|---|---|
| | $C_0$ (μM) | $T_{1/2}$ (hr) | $Vd_{ss}$ (L/kg) | Cl (mL/min/kg) | $AUC_{0-last}$ (μM · hr) |
| Compound 1 | 17.6 | 1.33 | 0.29 | 9.90 | 7.2 |

Note:
$C_0$ is the initial concentration, $T_{1/2}$ is the elimination half-life, $Vd_{ss}$ is the steady-state apparent volume of distribution, Cl is the total clearance rate, and $AUC_{0-last}$ is the area under the plasma concentration-time curve from 0 time to the last quantifiable time point.

Experimental conclusion: The compound of the present disclosure has good pharmacokinetic properties.

The invention claimed is:

1. A compound represented by formula (I) or a pharmaceutically acceptable salt thereof,

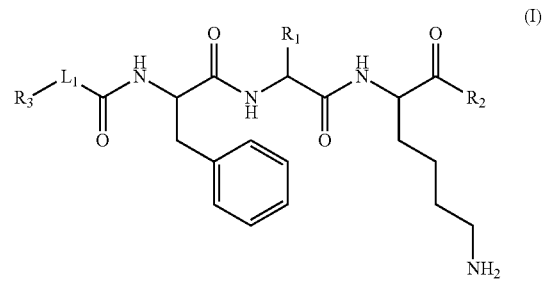

wherein, $R_1$ is selected from $C_{3-5}$ cycloalkyl and —$C_{1-3}$ alkyl-$C_{3-5}$ cycloalkyl, and the $C_{3-5}$ cycloalkyl and —$C_{1-3}$ alkyl-$C_{3-5}$ cycloalkyl are optionally substituted by 1, 2 or 3 $R_a$;

$R_2$ is selected from

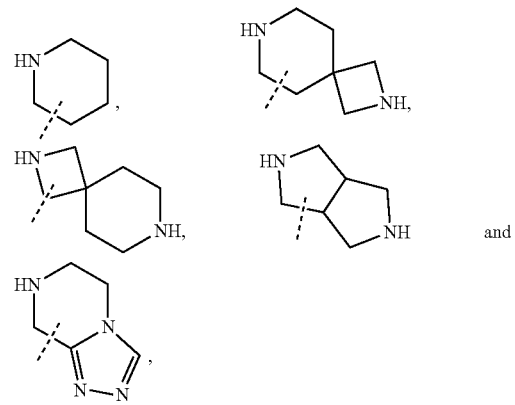

and the

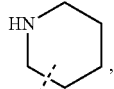 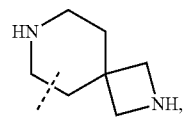

 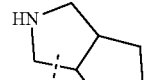 and

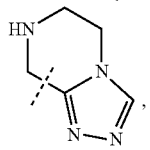, are optionally substituted by 1, 2 or 3 $R_b$;

L$_1$ is selected from —N(R$_e$)—C(R$_c$)(R$_d$)— with the nitrogen atom connected to R$_3$ and the carbon atom connected to —C(=O)—;

R$_3$ is selected from —C$_{1-3}$ alkyl-phenyl, and the —C$_{1-3}$ alkyl-phenyl is optionally substituted by 1, 2 or 3 R$_f$;

R$_a$ and R$_f$ are selected from F, Cl, Br and CH$_3$;

R$_b$ is selected from F, Cl, Br, NH$_2$, COOH, C$_{1-3}$ alkyl, C$_{1-3}$ alkoxy, —C(=O)—C$_{1-3}$ alkyl and —NH—C(=O) NH—C$_{1-3}$ alkyl, and the C$_{1-3}$ alkyl, C$_{1-3}$ alkoxy, —C(=O)—C$_{1-3}$ alkyl and —NH—C(=O) NH—C$_{1-3}$ alkyl are optionally substituted by 1, 2 or 3 R;

R$_c$ and R$_d$ are each independently selected from H, NH$_2$ and CH$_3$;

R$_e$ is selected from H and CH$_3$;

R is selected from F, Cl and Br.

2. The compound or the pharmaceutically acceptable salt thereof according to claim 1, wherein, R$_1$ is selected from cyclopropyl, cyclopentyl and —CH$_2$-cyclopropyl, and the cyclopropyl, cyclopentyl and —CH$_2$-cyclopropyl are optionally substituted by 1, 2 or 3 R$_a$.

3. The compound or the pharmaceutically acceptable salt thereof according to claim 2, wherein, R$_1$ is selected from

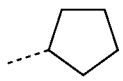 and .

4. The compound or the pharmaceutically acceptable salt thereof according to claim 1, wherein, R$_b$ is selected from F, Cl, Br, NH$_2$, COOH, CH$_3$, CF$_3$, OCH$_3$, —C(=O)—CH$_3$ and —NH—C(=O) NH—CH$_3$.

5. The compound or the pharmaceutically acceptable salt thereof according to claim 1, wherein, R$_2$ is selected from

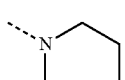, 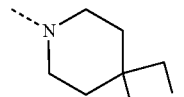,

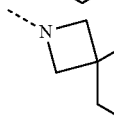, 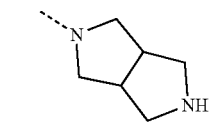 and

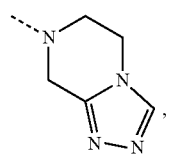, and the

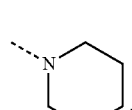, 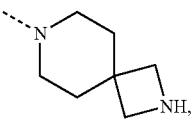,

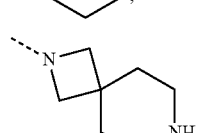,

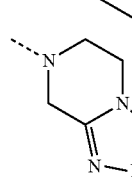

are optionally substituted by 1, 2 or 3 R$_b$.

6. The compound or the pharmaceutically acceptable salt thereof according to claim 5, wherein, R$_2$ is selected from

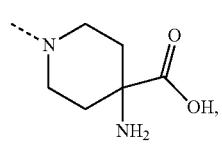, 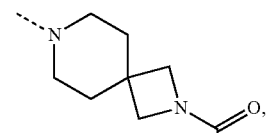,

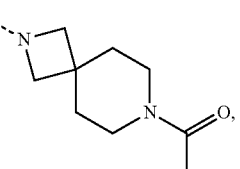, 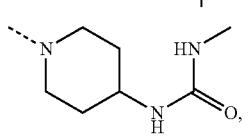,

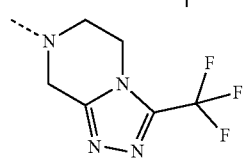 and

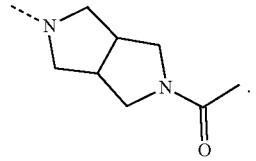.

7. The compound or the pharmaceutically acceptable salt thereof according to claim 1, wherein, R$_3$ is selected from

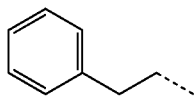 and , 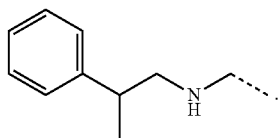

and the

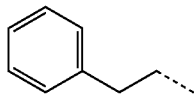 and 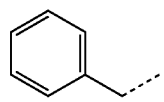

are optionally substituted by 1, 2 or 3 $R_f$.

8. The compound or the pharmaceutically acceptable salt thereof according to claim 7, wherein, $R_3$ is selected from

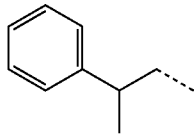 and 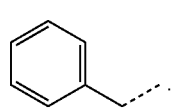

9. The compound or the pharmaceutically acceptable salt thereof according to claim 1, wherein, Li is selected from —NH—CH$_2$—.

10. The compound or the pharmaceutically acceptable salt thereof according to claim 1, wherein, $R_3$-$L_1$- is selected from

11. The compound or the pharmaceutically acceptable salt thereof according to claim 1, wherein, the compound is selected from

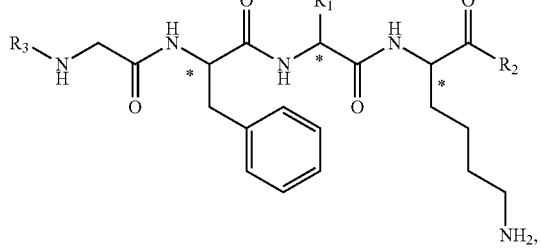

wherein, $R_1$, $R_2$ and $R_3$ are as defined above;

the carbon atoms with "*" are chiral carbon atoms and exist in the form of (R) or(S) single enantiomer or enriched in one enantiomer.

12. A compound represented by the following formula or a pharmaceutically acceptable salt thereof, wherein, the compound is selected from:

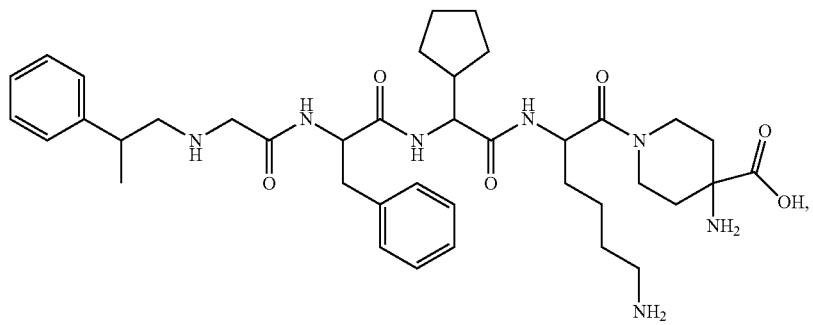

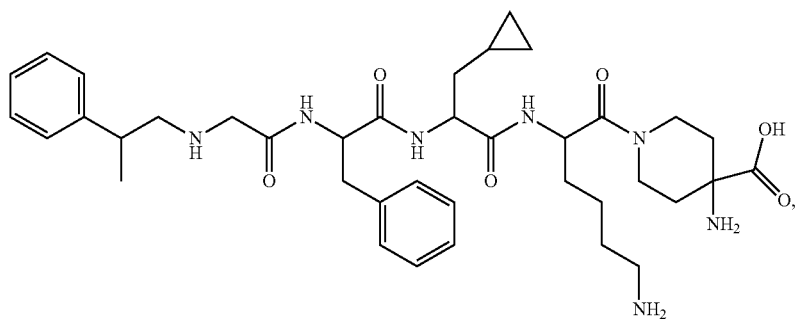

-continued
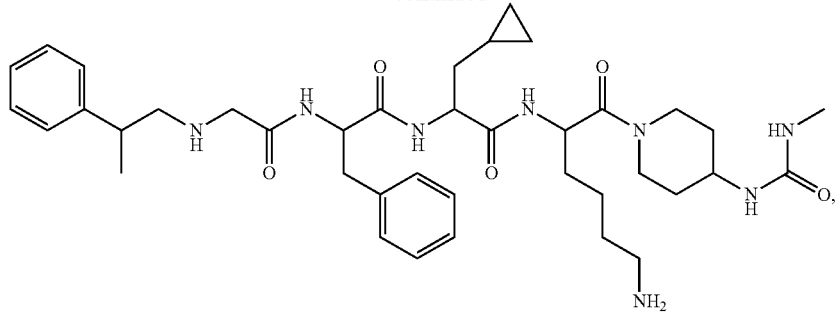
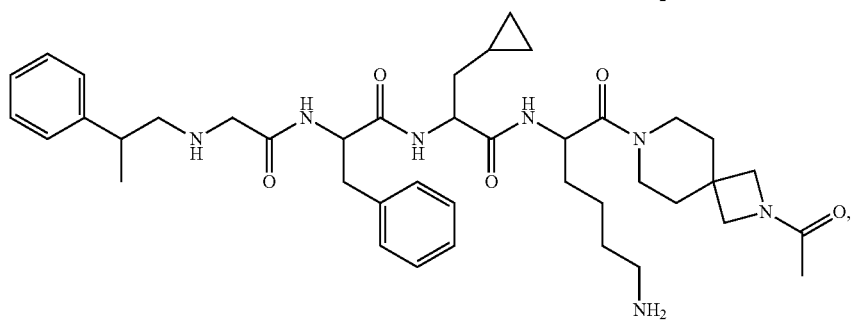
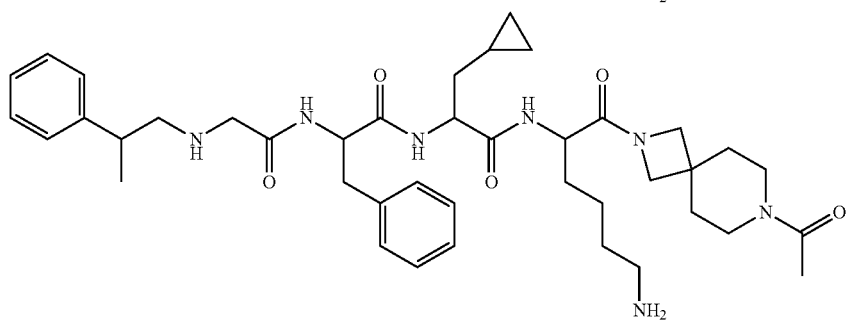
and
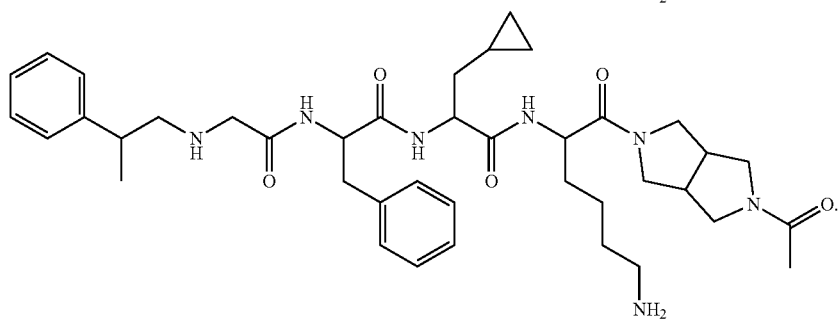
13. The compound or the pharmaceutically acceptable salt thereof according to claim 12, wherein, the compound is selected from:
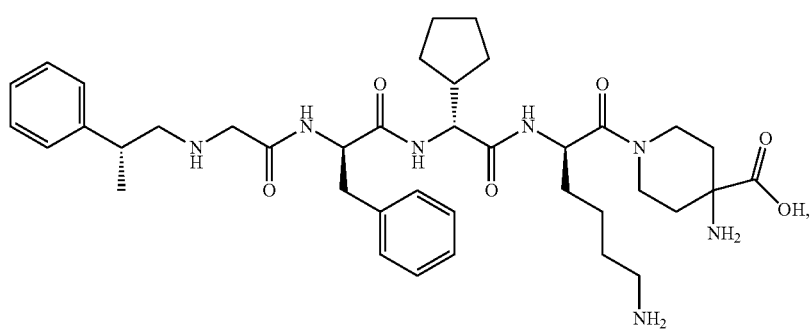

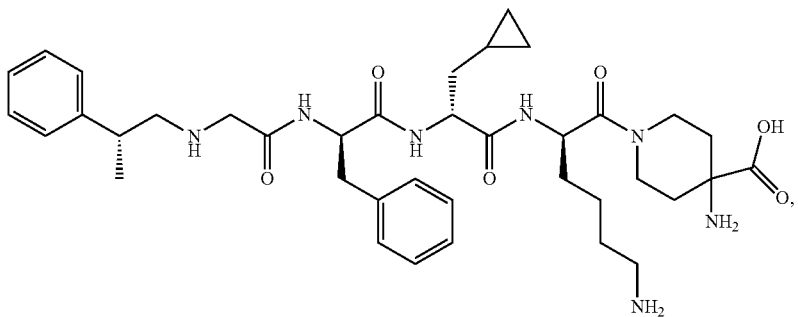
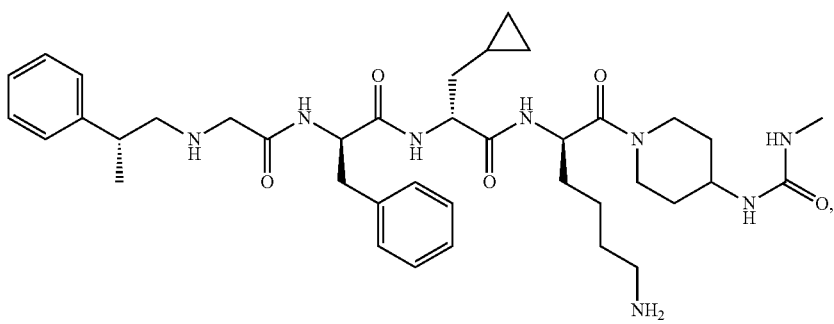
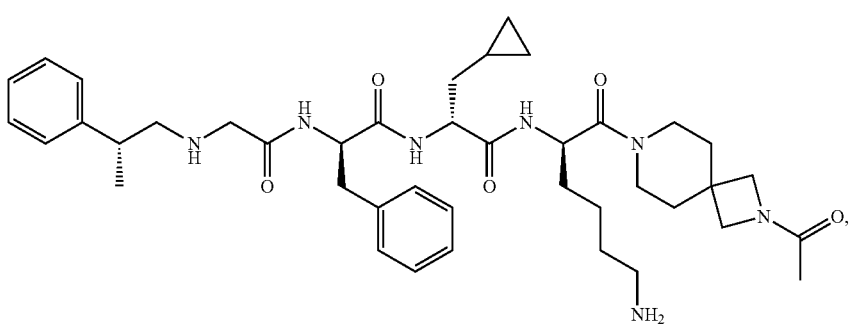
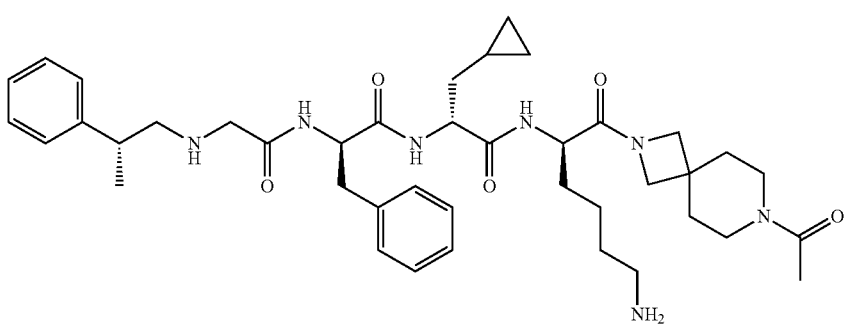
and
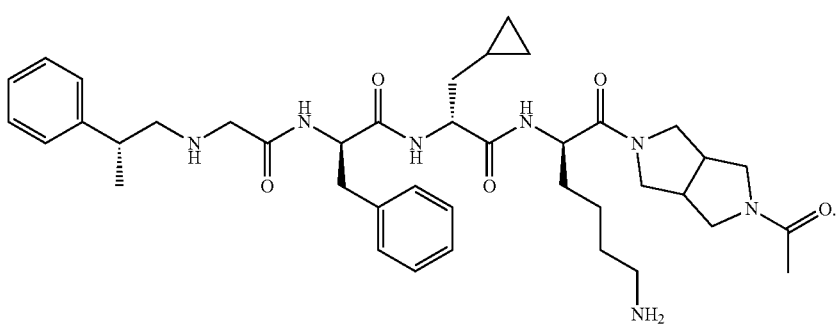

14. A method for activating kappa receptor in a subject in need thereof, comprising: administering an effective amount of the compound or the pharmaceutically acceptable salt thereof according to claim 1 to the subject.

15. A method for treating pain and pruritus in a subject in need thereof, comprising: administering an effective amount of the compound or the pharmaceutically acceptable salt thereof according to claim 1 to the subject.

* * * * *